(12) United States Patent
Saito et al.

(10) Patent No.: US 9,282,440 B2
(45) Date of Patent: Mar. 8, 2016

(54) WIRELESS COMMUNICATION DEVICE, PROGRAM, AND COMMUNICATION CONTROL METHOD

(71) Applicant: Sony Corporation, Tokyo (JP)

(72) Inventors: Erika Saito, Tokyo (JP); Tomoya Yamaura, Tokyo (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 212 days.

(21) Appl. No.: 14/042,916

(22) Filed: Oct. 1, 2013

(65) Prior Publication Data

US 2014/0099987 A1   Apr. 10, 2014

(30) Foreign Application Priority Data

Oct. 9, 2012   (JP) ................................. 2012-224013

(51) Int. Cl.
*H04W 4/08*   (2009.01)
*H04W 84/20*   (2009.01)

(52) U.S. Cl.
CPC ............... *H04W 4/08* (2013.01); *H04W 84/20* (2013.01)

(58) Field of Classification Search
CPC .................................. H04W 4/08; H04W 84/20
See application file for complete search history.

(56) References Cited

U.S. PATENT DOCUMENTS

| 2013/0148568 A1* | 6/2013 | Iimori | H04W 40/02 370/315 |
| 2014/0324931 A1* | 10/2014 | Grube | G06F 17/30206 707/828 |
| 2014/0325224 A1* | 10/2014 | Grube | G06F 17/30194 713/168 |

FOREIGN PATENT DOCUMENTS

JP   2010-049158 A   3/2010

* cited by examiner

*Primary Examiner* — Bobbak Safaipour
(74) *Attorney, Agent, or Firm* — Hazuki International, LLC

(57) ABSTRACT

There is provided a wireless communication device including a wireless communication section which receives, in a group for wireless communication, information indicating a state of content use or provision by another device in the group, a calculation section which calculates, based on the received information, a number of devices operating a function of providing the content in the group and a number of devices operating a function of using the content in the group, and a judgment section which judges whether to change a topology of the group based on a relationship between the number of devices operating the function of providing the content and the number of devices operating the function of using the content and on states of content provision and use by a device operating as a master unit in the group.

17 Claims, 17 Drawing Sheets

WIRELESS COMMUNICATION DEVICE, PROGRAM, AND COMMUNICATION CONTROL METHOD

BACKGROUND

The present disclosure relates to a wireless communication device, a program, and a communication control method.

In recent years, a wireless LAN (Local Area Network) system typified by IEEE (Institute of Electrical and Electronics Engineers) 802.11 has come into widespread use, replacing wire networks, due to its high degree of freedom of devices. For example, as disclosed in JP 2010-49158A, a wireless LAN system defined by the IEEE 802.11 includes a group of wireless communication devices that include an access point operating as a master unit and a plurality of stations operating as slave units, and a plurality of stations are connected to a single access point. In such a wireless LAN system, it is determined that the access point should operate as a master unit and the stations should operate as slave units.

Meanwhile, Wi-Fi Direct defined by the Wi-Fi Alliance is used to form a wireless communication group with a plurality of wireless communication devices directly connected to each other. In forming a wireless communication group, it is determined which of a master unit or a slave unit each wireless communication device should operate. For example, each wireless communication device exchanges a parameter, which indicates the priority to operate as a master unit, with other wireless communication devices and compares the parameters indicating the priority, thereby determining which of a master unit or a slave unit each wireless communication device should operate.

SUMMARY

However, the efficiency of data paths in a topology of a formed group (mode of connection) varies depending on which wireless communication device in the group provides content and which wireless communication device uses the content. For this reason, the data paths in the topology of the group might be inefficient, depending on a state of content use or provision.

Hence, it is desirable to provide a mechanism enabling wireless communication devices to perform communication through efficient data paths in a wireless communication group.

According to an embodiment of the present disclosure, there is provided a wireless communication device including a wireless communication section which receives, in a group for wireless communication, information indicating a state of content use or provision by another device in the group, a calculation section which calculates, based on the received information, a number of devices operating a function of providing the content in the group and a number of devices operating a function of using the content in the group, and a judgment section which judges whether to change a topology of the group based on a relationship between the number of devices operating the function of providing the content and the number of devices operating the function of using the content and on states of content provision and use by a device operating as a master unit in the group.

Further, according to an embodiment of the present disclosure, there is provided a program causing a computer which controls a wireless communication device to function as an acquisition section which acquires information indicating a state of content use or provision by another device in a group for wireless communication when the wireless communication device receives the information in the group, a calculation section which calculates, based on the received information, a number of devices operating a function of providing the content in the group and a number of devices operating a function of using the content in the group, and a judgment section which judges whether to change a topology of the group based on a relationship between the number of devices operating the function of providing the content and the number of devices operating the function of using the content and on states of content provision and use by a device operating as a master unit in the group.

Further, according to an embodiment of the present disclosure, there is provided a communication control method including receiving, in a group for wireless communication, information indicating a state of content use or provision by another device in the group, calculating, based on the received information, a number of devices operating a function of providing the content in the group and a number of devices operating a function of using the content in the group, and judging whether to change a topology of the group based on a relationship between the number of devices operating the function of providing the content and the number of devices operating the function of using the content and on states of content provision and use by a device operating as a master unit in the group.

As described above, according to embodiments of the present disclosure, the wireless communication device can perform communication through efficient data paths in the wireless communication group.

DETAILED DESCRIPTION OF THE EMBODIMENT

Figure 1:
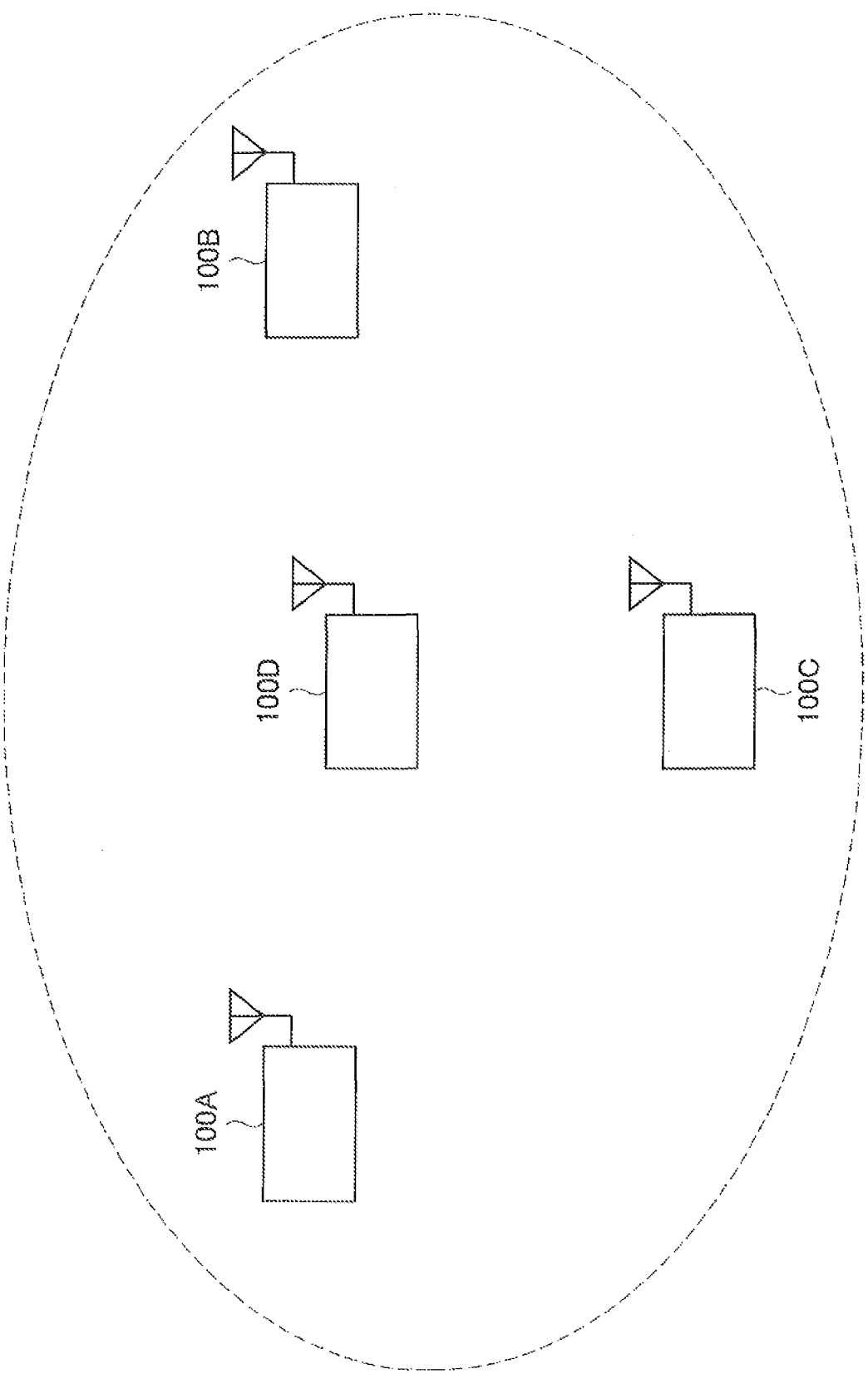
FIG. 1 is an explanatory diagram illustrating a configuration of a wireless communication system according to one embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions will be given in the following order.
1. Configuration of Wireless Communication System
2. Configuration of Wireless Communication Device
3. Processing Flow
4. Specific Examples of Topology Change
5. Summarization <1. Configuration of Wireless Communication System>

FIG. 1 is an explanatory diagram illustrating a configuration of a wireless communication system according to an embodiment of the present disclosure. The wireless communication system according to the present embodiment includes a plurality of wireless communication devices 100. FIG. 1 illustrates, as an example of the plurality of wireless communication devices 100, wireless communication devices 100A, 100B, 100C, and 100D which are located at distances allowing mutual wireless communication.

The plurality of wireless communication devices 100 form a group for wireless communication (hereinafter, referred to as a "wireless communication group"). More specifically, for example, the aforementioned wireless communication group is a directly connected group using wireless communication which includes one master unit directly connected to one or more slave units. In this case, the wireless communication devices 100 form the wireless communication group by being directly connected to their neighboring wireless communication devices 100, and thereby can communicate with the neighboring wireless communication devices 100 without using a dedicated access point or the like. Hereinafter, an example of such a topology of a group (mode of connection) will be described more specifically with reference to FIG. 2.

Figure 2:
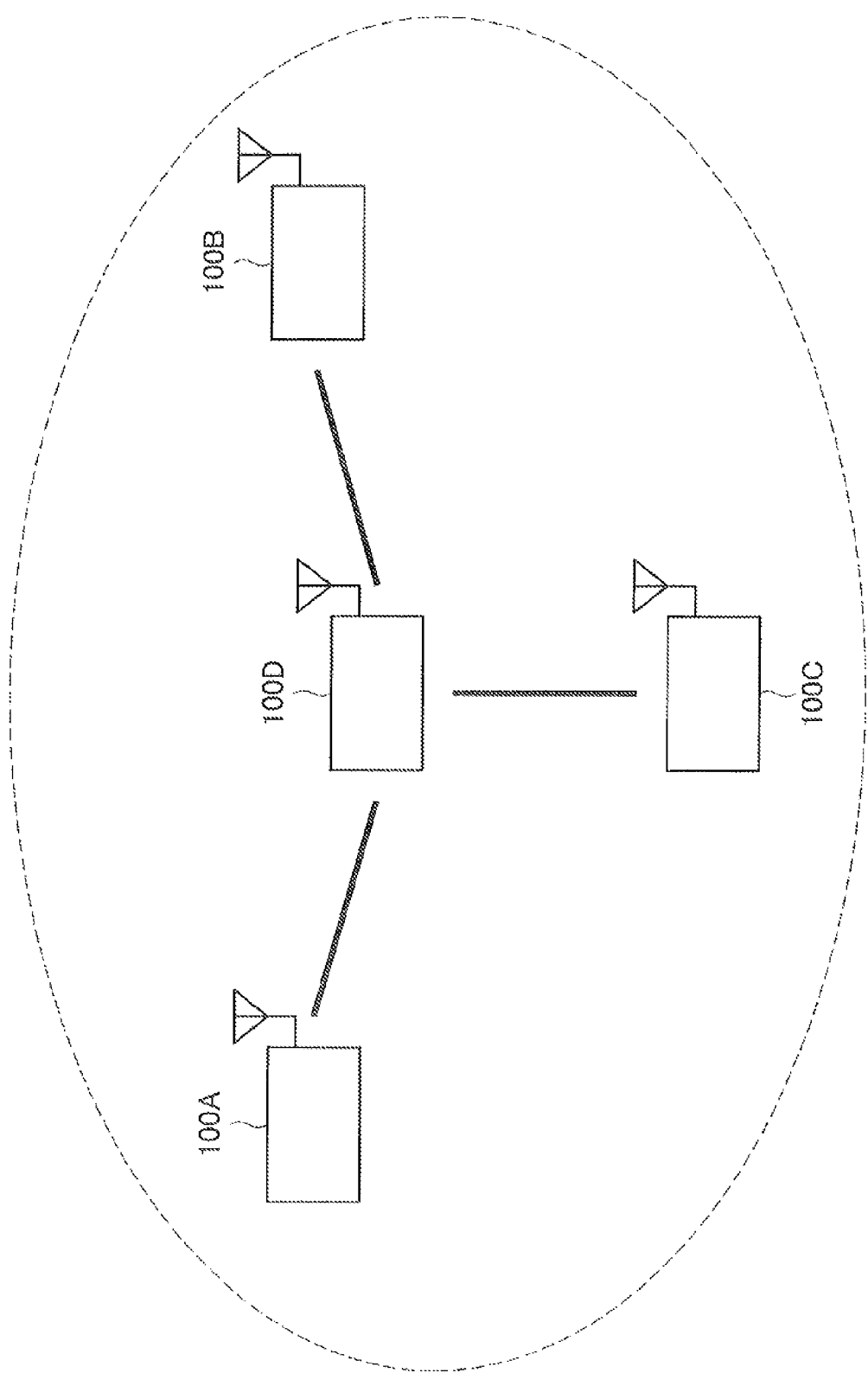
FIG. 2 is an explanatory diagram illustrating a topology of a wireless communication group.

FIG. 2 is an explanatory diagram illustrating an example of a topology of a wireless communication group. FIG. 2 illustrates the wireless communication devices 100A, 100B, 100C, and 100D, like FIG. 1. In this example, the wireless communication device 100D operates as a master unit, the wireless communication devices 100A, 100B, and 100C operate as slave units. That is, the wireless communication device 100D which is the master unit is directly connected to the wireless communication devices 100A, 100B, and 100C which are the slave units. When being transmitted from a certain slave unit to another slave unit, data passes through the master unit (that is, the wireless communication device 100D). A star topology is formed in this way, for example.

In an example, a wireless communication group is formed in the wireless communication system in compliance with Wi-Fi Direct defined by the Wi-Fi Alliance. Specifically, when the wireless communication group is formed, for example, the wireless communication device 100A determines that the wireless communication device 100A should operate as a master unit (Group Owner) or a slave unit (Client) in accordance with Wi-Fi Direct defined by the Wi-Fi Alliance. Specifically, the wireless communication device 100A exchanges a parameter which indicates the priority to operate as a master unit, with the neighboring wireless communication device 100B, 100C, or 100D, and compares the parameters indicating the priority. Thereby, each of the paired two devices determines that the device should operate as a master unit or a slave unit. Then, the wireless communication device 100A forms the wireless communication group with the neighboring wireless communication device 100B, 100C, or 100D in accordance with the determined topology (that is, a master-slave relationship).

Note that one of the wireless communication devices 100 which operates as a master unit manages and controls communication by the other one or more wireless communication devices 100 operating as the slave units).

For example, content is included in data transmitted and received between the wireless communication devices 100 in the wireless communication group. An example of the content is: audio content such as music, a lecture, or a radio program; or video content such as a TV program, a movie, a video program, a photo, a document, a picture, or a chart. Such content is transmitted, for example, from a wireless communication device which is executing an application for providing the content to a wireless communication device which is executing an application for using the content.

In an example, the wireless communication device 100A has an application for providing video content and can function as a video-providing device. The wireless communication device 100D has an application for reproducing the provided video content and can function as a video-reproducing device. In this case, by forming the wireless communication group together with the wireless communication device 100D, the wireless communication device 100A can transmit the video content to the wireless communication device 100D and can cause the wireless communication device 100D to reproduce the video content.

Each wireless communication device 100 described above may be an image processing device such as a PC (Personal Computer), a home video recorder, a home game machine, a household electric appliance, a mobile phone, a PHS (Personal Handyphone System), a mobile music player, a mobile video processor, a display device, or an audio output device.

The description has heretofore been given of the configuration of the wireless communication system according to the present embodiment. In the present embodiment, by changing a topology of a wireless communication group, it is possible for the wireless communication devices 100 to perform communication through efficient data paths in the wireless communication group. More specifically, when the topology has inefficient data paths, the topology is replaced with a topology having more efficient data paths. Hereinafter, topologies having inefficient and more efficient data paths will be described more specifically with reference to FIGS. 3 and 4.

Figure 3:
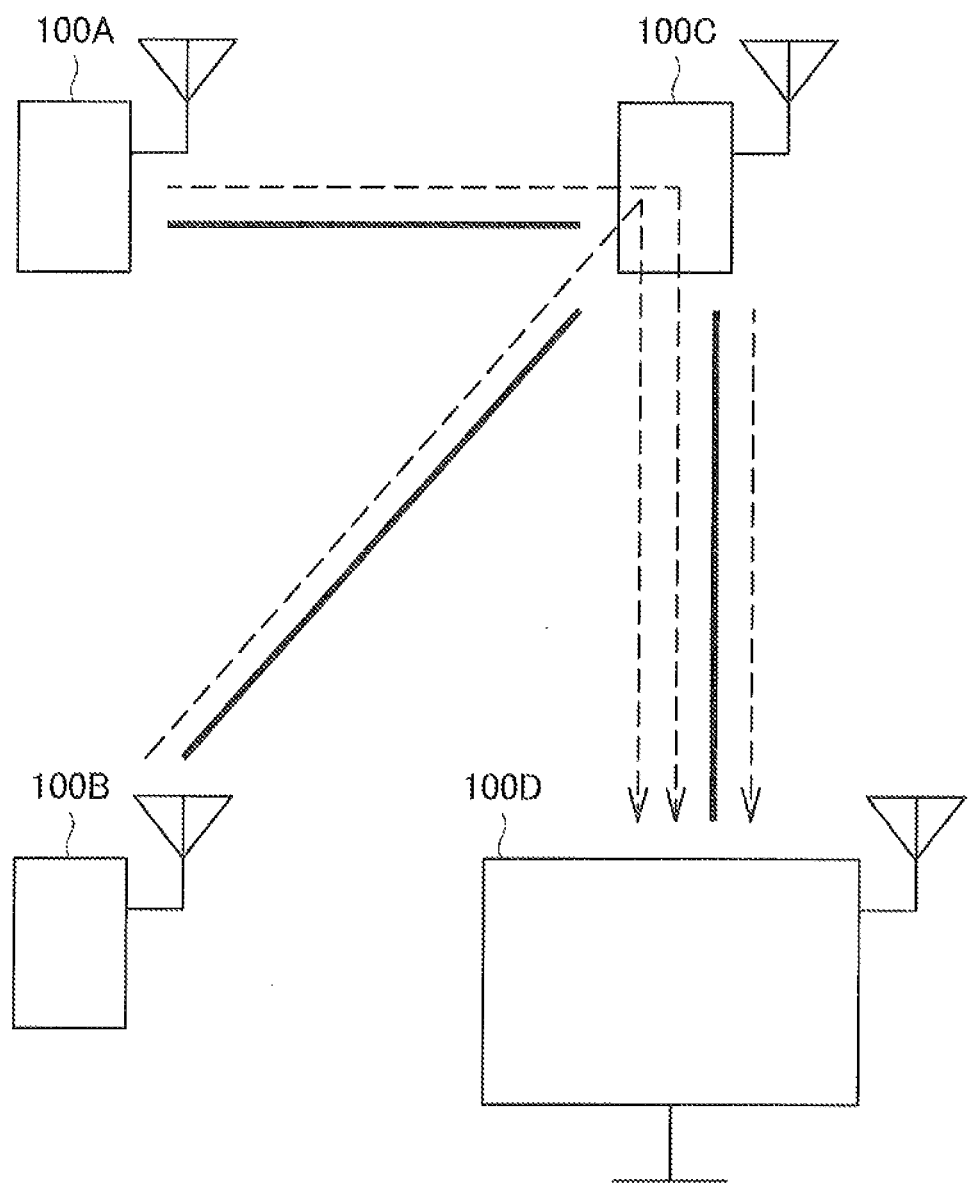
FIG. 3 is an explanatory diagram illustrating an example of a topology having inefficient data paths.

FIG. 3 is an explanatory diagram illustrating an example of a topology having inefficient data paths. FIG. 3 illustrates the wireless communication devices 100A, 100B, 100C, and 100D belonging to the same wireless communication group. In this example, the wireless communication device 100C operates as a master unit, and the wireless communication devices 100A, 100B, and 100D operate as slave units. In addition, the wireless communication devices 100A, 100B, and 100C are devices currently operating a function of providing content, and the wireless communication device 100D is a device currently operating a function of using content. In this case, content transmitted by the wireless communication devices 100A and 100B is received by the wireless communication device 100D through the wireless communication device 100C. In other words, data paths from the wireless communication device 100A to the wireless communication device 100D and from the wireless communication device 100B to the wireless communication device 100D can be said to be inefficient.

Figure 4:
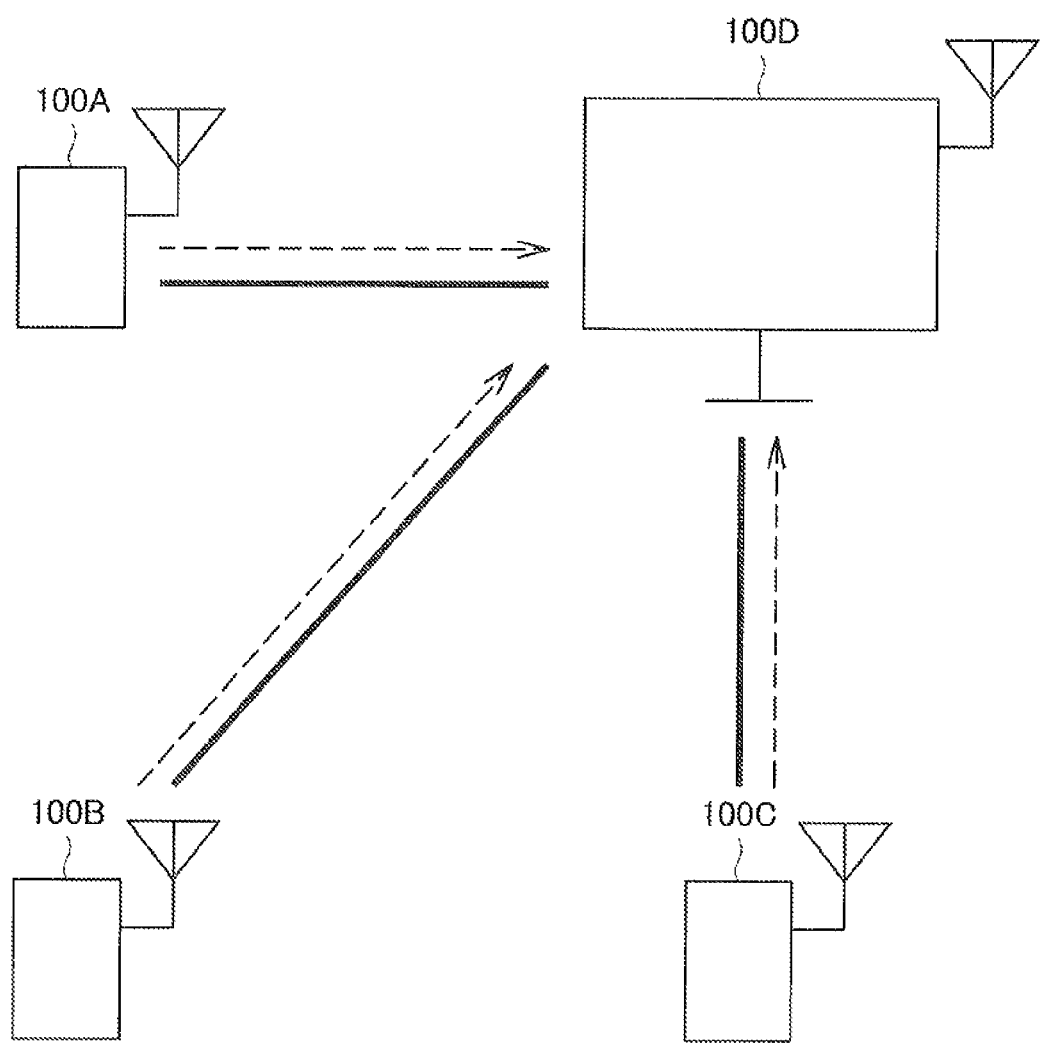
FIG. 4 is an explanatory diagram illustrating an example of a topology having more efficient data paths.

FIG. 4 is an explanatory diagram illustrating an example of a topology having more efficient data paths. FIG. 4 illustrates the wireless communication devices 100A, 100B, 100C, and 100D belonging to the same wireless communication group. In this example, the wireless communication device 100D operates as a master unit, and the wireless communication devices 100A, 100B, and 100C operate as slave units. In addition, like the example in FIG. 3, the wireless communication devices 100A, 100B, and 100C are devices currently operating the function of providing content, and the wireless communication device 100D is a device currently operating the function of using content. In this case, content transmitted from each of the wireless communication devices 100A, 100B, and 100C is directly received by the wireless communication device 100D without passing through any wireless communication device 100 other than the corresponding wireless communication device 100A, 100B, or 100C. In other words, data paths from the wireless communication devices 100A, 100B, and 100C to the wireless communication device 100D can be said to be efficient.

In the present embodiment, when the topology has the inefficient data paths as illustrated in FIG. 3, a topology having more efficient data paths as illustrated in FIG. 4 is used instead of the topology in FIG. 3.

Hereinafter, the specific details of the topology will be described in <2. Configuration of Wireless Communication Device>, <3. Processing Flow>, and <4. Specific Examples of Topology Change>.

<2. Configuration of Wireless Communication Device>

Figure 5:
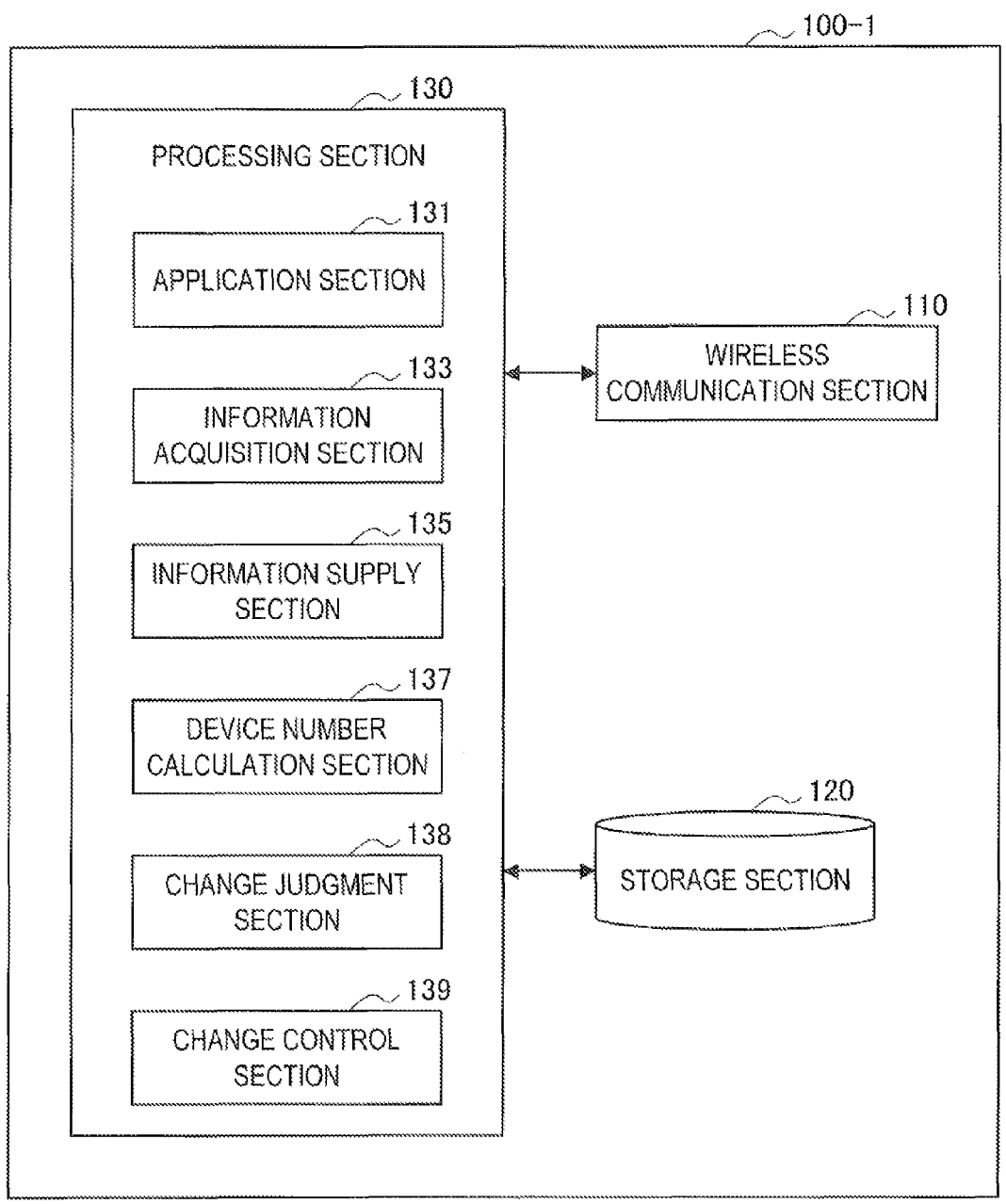
FIG. 5 is a block diagram illustrating an example of a wireless communication device according to the one embodiment.
Figure 6:
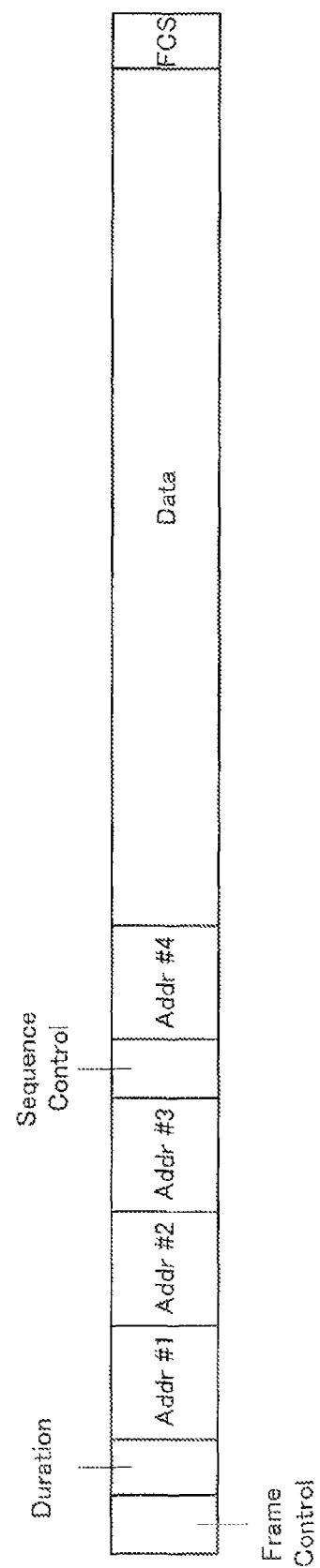
FIG. 6 is an explanatory diagram illustrating an example of a data frame of wireless LAN.

An example of a configuration of each wireless communication device 100 according to the present embodiment will be described with reference to FIGS. 5 and 6. FIG. 5 is a block diagram illustrating an example of the configuration of the wireless communication device 100 according to the present embodiment. With reference to FIG. 5, the wireless communication device 100 includes a wireless communication section 110, a storage section 120, and a processing section 130.

(Wireless Communication Section 110)

The wireless communication section 110 performs wireless communication with at least one of the other wireless communication devices 100. For example, the wireless communication section 110 includes an antenna and an RF circuit.

In the wireless communication group, the wireless communication section 110 particularly receives information indicating a state of content use or provision by the other wireless communication device 100 in the group (hereinafter, referred to as "content use/provision information" of the other wireless communication device 100). For example, when the wireless communication device 100 operates as a master unit in the wireless communication group, the wireless communication section 110 receives content use/provision information transmitted from the other wireless communication device 100 operating as a slave unit. Then, the wireless communication device 100 outputs the received content use/provision information to the processing section 130 (an information acquisition section 133).

In addition, for example, the wireless communication section 110 transmits information indicating a state of content use or provision by the wireless communication device 100 (that is, content use/provision information of the wireless communication device 100). For example, when the wireless communication device 100 operates as the slave unit in the wireless communication group, the wireless communication section 110 transmits the content use/provision information of the wireless communication device 100 to the other wireless communication device 100 operating as the master unit. Note that the content use/provision information is acquired from the processing section 130 (an information supply section 135).

For example, the wireless communication section 110 also transmits or receives the content depending on an operation of the processing section 130 (an application section 131).

For example, the wireless communication section 110 also transmits information necessary for a change to a new topology to the other wireless communication device 100 in the wireless communication group under control by the processing section 130 (a change control section 139). For example, when the wireless communication device 100 operates as the master unit in the wireless communication group, the wireless communication section 110 transmits information necessary for the change.

For example, the wireless communication section 110 also receives information necessary for a change to a new topology. For example, when the wireless communication device 100 operates as the slave unit in the wireless communication group, the wireless communication section 110 receives information necessary for the change.

(Storage Section 120)

The storage section 120 stores a program and data for the operation of the wireless communication device 100. The storage section 120 includes a storage medium such as a hard disk or a semiconductor memory.

(Processing Section 130)

The processing section 130 provides various functions of the wireless communication device 100. For example, the processing section 130 corresponds to a processor such as a CPU or a DSP, and provides the various functions by executing the program in the storage section 120 or another storage medium. The processing section 130 includes the application section 131, the information acquisition section 133, the information supply section 135, a device number calculation section 137, a change judgment section 138, and the change control section 139.

(Application Section 131)

The application section 131 executes applications held by the wireless communication device 100. The applications are, for example, an application for using content (hereinafter, referred to as a "use-side application") and an application for providing content (referred to as a "provision-side application").

For example, when the application section 131 executes the use-side application, the wireless communication section 110 receives content provided by the other wireless communication device 100. Then, the application section 131 acquires and outputs the content. For example, when the content is audio content, the application section 131 reproduces the content. As described above, when the application section 131 executes the use-side application, the wireless communication device 100 functions as a content-using device, for example, (a content-reproducing device, for example).

For example, when executing the provision-side application, the application section 131 causes the wireless communication section 110 to transmit the content to be provided to the other wireless communication device 100. As described above, when the application section 131 executes the provision-side application, the wireless communication device 100 functions as a content-providing device.

(Information Acquisition Section 133)

When the wireless communication section 110 receives information indicating a state of content use or provision by the other wireless communication device 100 in the wireless communication group (that is, the content use/provision information of the other wireless communication device 100), the information acquisition section 133 acquires the content use/provision information. For example, when the wireless communication device 100 operates as the master unit in the wireless communication group, the information acquisition section 133 acquires the content use/provision information of the other wireless communication device 100 operating as the slave unit in the wireless communication group.

For example, when the other wireless communication device 100 executes the use-side application, the content use/provision information of the other wireless communication device 100 indicates that the other wireless communication device 100 uses content. In addition, for example, when the other wireless communication device 100 executes the provision-side application, the content use/provision information of the other wireless communication device 100 indicates that the other wireless communication device 100 provides content.

In addition, for example, when the other wireless communication device 100 terminates the execution of the use-side application or the provision-side application, the content use/provision information of the other wireless communication device 100 indicates that the other wireless communication device 100 neither uses nor provides content.

Note that the content use/provision information may be any information, as long as the information can directly or indirectly indicate a state of content use or provision by the corresponding wireless communication device 100. For example, the content use/provision information may be information notifying start or termination of execution of the use-side or provision-side application.

(Information Supply Section 135)

The information supply section 135 supplies the information indicating a state of content use or provision by the wireless communication device 100 (that is, the content use/provision information of the wireless communication device 100). For example, when the wireless communication device 100 operates as the slave unit in the wireless communication group, the information supply section 135 supplies the content use/provision information of the wireless communication device 100. For example, the information supply section 135 supplies the content use/provision information by causing the wireless communication section 110 to transmit the content use/provision information.

The information supply section 135 can supply the content use/provision information at several timings.

For example, when the application section 131 starts executing an application, the information supply section 135 supplies content use/provision information appropriate for the application. More specifically, for example, when the application section 131 starts executing the use-side application, the information supply section 135 supplies content use/provision information indicating that the wireless communication device 100 uses content. When the application section 131 starts executing the provision-side application, the information supply section 135 supplies content use/provision information indicating that the wireless communication device 100 provides content.

For example, when the application section 131 terminates the execution of the use-side application or the provision-side application, the information supply section 135 supplies content use/provision information indicating that the wireless communication device 100 neither uses nor provides content.

For example, also when the wireless communication device 100 joins the wireless communication group as the slave unit, the information supply section 135 supplies content use/provision information appropriate for a state of application execution. More specifically, for example, in the case where the wireless communication device 100 executes the application before joining the wireless communication group, the information supply section 135 supplies the content use/provision information appropriate for the state of application execution when the wireless communication device 100 joins the wireless communication group.

Note that instead of any of the aforementioned timings or in combination with the timing, the information supply section 135 may regularly supply content use/provision information.

(Device Number Calculation Section 137)

Based on the content use/provision information received by the wireless communication section 110, the device number calculation section 137 calculates: the number of devices currently operating the function of providing content in the wireless communication group (hereinafter, referred to as "content-providing devices"); and the number of devices currently operating the function of using content in the aforementioned group (hereinafter, referred to as "content-using devices"). Naturally, in calculating the numbers, the device number calculation section 137 takes into consideration a state of content provision or use by a device which operates as the master unit in the wireless communication group (that is, the wireless communication device 100). Also, for example, when the wireless communication device 100 operates as the master unit in the wireless communication group, the device number calculation section 137 calculates the number of content-providing devices and the number of content-using devices.

A specific example is described with reference to FIGS. 3 and 4. The wireless communication devices 100A, 100B, and 100C are the content-providing devices, and the wireless communication device 100D is the content-using device. In this case, the device number calculation section 137 obtains 3 by calculating the number of content-providing devices and obtains 1 by calculating the number of content-using devices.

The aforementioned content is content, for example, which satisfies a predetermined condition. More specifically, for example, the predetermined condition includes a condition that a data amount of content exceeds a predetermined value. That is, the aforementioned content is content having a data amount exceeding the predetermined value. In this case, the device number calculation section 137 calculates: the number of devices currently operating the function of providing the content having a data amount exceeding the predetermined value, as the number of content-providing devices; and the number of devices currently operating the function of using the content having a data amount exceeding the predetermined value, as the number of content-using devices. Information indicating the data amount of the content is transmitted and received between the wireless communication devices 100, for example, together with or separately from the content use/provision information.

Note that the predetermined condition may include a condition that the content is demanded to have real-time properties. That is, the aforementioned content is the content demanded to have real-time properties. In this case, the device number calculation section 137 calculates: the number of devices currently operating the function of providing the content demanded to have real-time properties, as the number of content-providing devices; and the number of devices currently operating the function of using the content demanded to have real-time properties, as the number of content-using devices. Information indicating that the content is demanded to have real-time properties is transmitted and received between the wireless communication devices 100, for example, together with or separately from the content use/provision information.

In addition, the predetermined condition may include a condition that the type of content falls under a predetermined type. In other words, the aforementioned content may be a predetermined type of content. Further specifically, for example, the predetermined type may include audio or video. In this case, the device number calculation section 137 calculates: the number of devices currently operating the function of providing the predetermined type of content such as audio content or video content, as the number of content-providing devices; and the number of devices currently operating the function of using the predetermined type of content, as the number of content-using devices. Information indicating the type of content is transmitted and received between the wireless communication devices 100, for example, together with or separately from the content use/provision information.

(Change Judgment Section 138)

The change judgment section 138 judges whether to change a topology of a wireless communication group, based on a relationship between the number of content-providing devices and the number of content-using devices and on a state of content provision or use by a device operating as the master unit in the wireless communication group. For example, when the wireless communication device 100 operates as the master unit in the wireless communication group, the change judgment section 138 judges whether to change the topology of the wireless communication group.

The changing of the topology of the wireless communication group is causing a different device to operate as the master unit. In other words, the change judgment section 138 judges whether to cause a different device to operate as the master unit, based on a relationship between the number of content-providing devices and the number of content-using devices and on a state of content provision or use by the wireless communication device 100 operating as the master unit in the wireless communication group.

More specifically, for example, suppose a case where the number of content-providing devices is larger than the number of content-using devices. In this case, if the wireless communication device 100 operating as the master unit is the content-providing device, the change judgment section 138 judges that the topology of the wireless communication group is to be changed (that is, a different device is to be caused to operate as the master unit). On the other hand, if the wireless communication device 100 operating as the master unit is the content-using device, the change judgment section 138 judges that the topology of the wireless communication group is to be maintained.

In addition, for example, suppose a case where the number of content-using devices is larger than the number of content-providing devices. In this case, if the wireless communication device 100 operating as the master unit is the content-using device, the change judgment section 138 judges that the topology of the wireless communication group is to be changed (that is, a different device is to be caused to operate as the master unit). On the other hand, if the wireless communication device 100 operating as the master unit is the content-providing device, the change judgment section 138 judges that the topology of the wireless communication group is to be maintained.

That is, if the wireless communication device 100 which is the master unit is the majority in the content-providing devices and the content-using devices, the change judgment section 138 judges that the topology of the wireless communication group is to be changed (that is, a different device is to be caused to operate as the master unit). On the other hand, if the wireless communication device 100 which is the master unit is the minority in the content-providing devices and the content-using devices, the change judgment section 138 judges that the topology of the wireless communication group is to be maintained.

A specific example is described with reference to FIG. 3. For example, the number of content-providing devices is 3, and the number of content-using devices is 1. Accordingly, the number of content-providing devices is larger than the number of content-using devices. In addition, the wireless communication device 100C operating as the master unit is the content-providing device. Thus, the wireless communication device 100C is the majority in the content-providing devices and the content-using device. Accordingly, in this example, the change judgment section 138 judges that the topology of the wireless communication group is to be changed (that is, a different device is to be caused to operate as the master unit).

Another specific example is described with reference to FIG. 4. As in FIG. 3, the number of content-providing devices is larger than the number of content-using devices, and the wireless communication device 100D operating as the master unit is the content-using device. Thus, the wireless communication device 100D is the minority in the content-providing devices and the content-using device. Accordingly, in this example, the change judgment section 138 judges that the topology of the wireless communication group is to be maintained.

(Change Control Section 139)

When judging that the topology of the wireless communication group is to be changed, the change control section 139 controls the change of the topology of the wireless communication group. For example, when the wireless communication device 100 operates as the master unit in the wireless communication group, the change control section 139 controls the change of the topology.

New Topology

Firstly, a description is given of the details of a new topology after the change. When it is judged that the topology of the wireless communication group is to be changed, in other words, when it is judged that a different device is to be caused to operate as the master unit, the different device operates as the master unit.

For example, one of the wireless communication devices 100 in the wireless communication group operates as a new master unit. Further specifically, for example, when the number of content-providing devices is larger than the number of content-using devices, the aforementioned one of the wireless communication devices 100 is the content-using device among the devices in the wireless communication group. When the number of content-using devices is larger than the number of content-providing devices, the aforementioned one of the wireless communication devices 100 is the content-providing device among the devices in the wireless communication group. In other words, one of the minority devices in the content-using devices and the content-providing devices operates as a new master unit.

In addition, the aforementioned one of the wireless communication devices 100 operates as the master unit in the aforementioned wireless communication group or in a new wireless communication group including part or all of the wireless communication devices 100 in the aforementioned wireless communication group. In other words, the new topology may be achieved in the existing wireless communication group or in the new wireless communication group. In an example, in the case of complying with Wi-Fi Direct, the new wireless communication group is formed, and a new topology is achieved in the new wireless communication group. Even though the new wireless communication group is formed, part or all of the wireless communication devices 100 in the existing group join the new wireless communication group. In this way, the one of the wireless communication devices 100 which is to operate as the new master unit operates as the master unit in the wireless communication group including part or all of the other wireless communication devices 100 in the existing wireless communication group.

Topology Change Control

Next, a description is given of topology change control by the change control section 139.

Firstly, for example, the change control section 139 determines a new topology of the wireless communication group. More specifically, for example, the change control section 139 determines one of the wireless communication devices 100 which is to operate as a new master unit. Further specifically, the change control section 139 determines one of the wireless communication devices 100 in the wireless communication group as the new master unit.

In more detailed description, for example, when the number of content-providing devices is larger than the number of content-using devices in the wireless communication group, the change control section 139 determines one of the content-using devices as the master unit. When the number of content-using devices is larger than the number of content-providing devices in the wireless communication group, the change control section 139 determines one of the content-providing devices as the master unit.

Secondly, for example, the change control section 139 generates information necessary for a change to a new topology (hereinafter, referred to as "topology change information"). The topology change information includes at least one of, for example: identification information for identifying one of the wireless communication devices 100 which is to newly operate as the master unit (hereinafter, referred to as "new-master-unit identification information"); information on security to be set (hereinafter, referred to as "security information"); and information on a channel to be used for the wireless communication (hereinafter, referred to as "channel information"). For example, the aforementioned new-master-unit identification information is a MAC (Media Access Control) address. For example, the aforementioned security information includes security types such as WPA (Wi-Fi Protected Access) and WPA2. For example, the aforementioned wireless communication is wireless LAN communication in compliance with the wireless LAN standards, and the aforementioned channel is a frequency band used for the wireless LAN communication.

Thirdly, for example, the change control section 139 causes the wireless communication section 110 to transmit the generated topology change information to the other wireless communication devices 100 in the wireless communication group. As described above, when it is judged that a different device is to be caused to operate as the master unit, the information necessary for a change to a new topology (that is, the topology change information) is shared in advance in the wireless communication group.

Fourthly, for example, the change control section 139 controls the wireless communication device 100 so that the wireless communication device 100 establishes connection in the new topology. Specifically, for example, the change control section 139 causes the wireless communication device 100 to connect, as the slave unit, to the one of the other wireless communication devices 100 which is to operate as the master unit in the new topology.

In connecting to the master unit, the change control section 139 uses the topology change information. For example, the change control section 139 causes the wireless communication device 100: to find the one other wireless communication device 100 identified by the new-master-unit identification information in the frequency band indicated by the channel information included in the topology change information (that is, the one other wireless communication device 100 which is to operate as the new master unit); and to connect to the found wireless communication device 100. More specifically, for example, the change control section 139 causes the wireless communication device 100 to perform beacon reception, key information exchange, a transaction for authentication, and the like in the frequency band.

Note that the topology of the wireless communication group does not have to be changed while the content is being transmitted and received. For example, the topology may be changed after the content is transmitted and received.

In the case where the wireless communication device 100 operates as the slave unit in the wireless communication group, the change control section 139 controls the wireless communication device 100 so that the wireless communication device 100 establishes connection in the new topology, by using the topology change information received by the wireless communication section 110, upon acquisition of the topology change information.

For example, in the case where the wireless communication device 100 operates as the slave unit also in the new topology, the change control section 139 causes the wireless communication device 100: to find the one other wireless communication device 100 identified by the new-master-unit identification information in the frequency band indicated by the channel information included in the topology change information (that is, the one other wireless communication device 100 which is to operate as the new master unit); and to connect to the found wireless communication device 100. More specifically, for example, the change control section 139 causes the wireless communication device 100 to perform beacon reception, key information exchange, a transaction for authentication, and the like in the frequency band.

For example, when the wireless communication device 100 operates as the master unit in the new topology, the change control section 139 causes the wireless communication device 100 to connect to the one other wireless communication device 100 operating as the slave unit in the frequency band indicated by the channel information included in the topology change information. More specifically, for example, the change control section 139 causes the wireless communication device 100 to perform beacon transmission, key information exchange, a transaction for authentication, and the like in the frequency band.

The description has heretofore been given of the example of the configuration of each wireless communication device 100 according to the present embodiment. As described above, the wireless communication device 100 transmits the content use/provision information and the topology change information. For example, the information is transmitted by utilizing a wireless LAN data frame as illustrated in FIG. 6.

<3. Processing Flow>

Subsequently, an example of communication control processing according to the present embodiment will be described with reference to FIGS. 7 to 12.

(Communication Control Processing by Master Unit)

Figure 7:
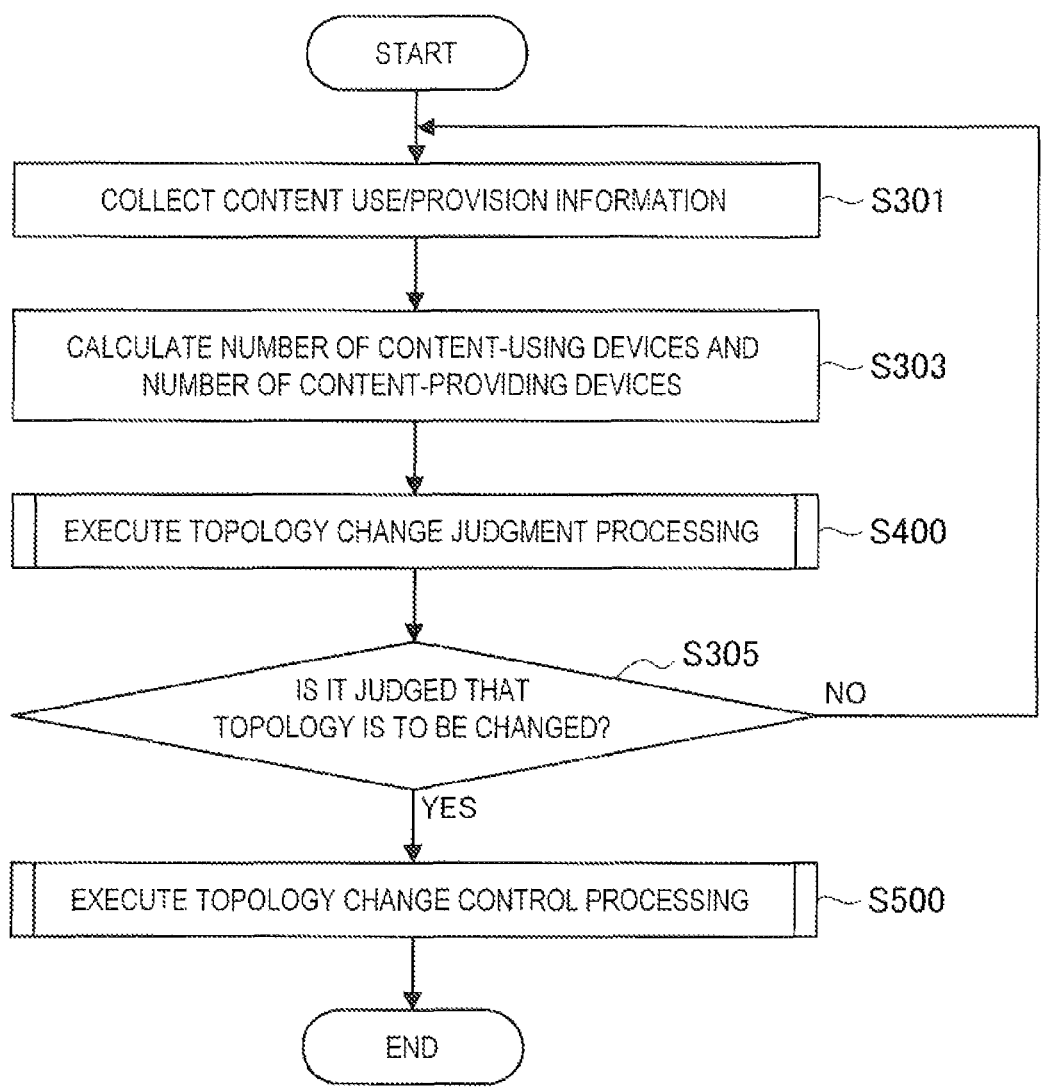
FIG. 7 is a flowchart illustrating an example of a schematic flow of communication control processing according to the one embodiment performed by a master unit.

Firstly, an example of communication control processing by a master unit will be described with reference to FIGS. 7 to 9. FIG. 7 is a flowchart illustrating an example of a schematic flow of the communication control processing according to the present embodiment performed by the master unit.

Firstly, in Step S301, the information acquisition section 133 collects content use/provision information of the other wireless communication devices 100 in the wireless communication group (that is, the wireless communication devices 100 operating as slave units).

Next, in Step S303, the device number calculation section 137 calculates the number of content-providing devices and the number of content-using devices in the wireless communication group, based on the content use/provision information of the other wireless communication devices 100.

Then, in Step S400, the change judgment section 138 executes topology change judgment processing. In other words, based on a relationship between the number of content-providing devices and the number of content-using devices and on a state of content provision or use by the wireless communication device 100, the change judgment section 138 judges whether to change the topology of the aforementioned wireless communication group.

If the topology change judgment processing judges in Step S305 that the topology of the wireless communication group is to be changed, the processing proceeds to Step S500. If not, the processing moves back to Step S301.

In Step S500, the change control section 139 executes topology change control processing. In other words, the change control section 139 controls the change of the topology of the wireless communication group. Then, the processing is terminated.

Topology Change Judgment Processing

Figure 8:
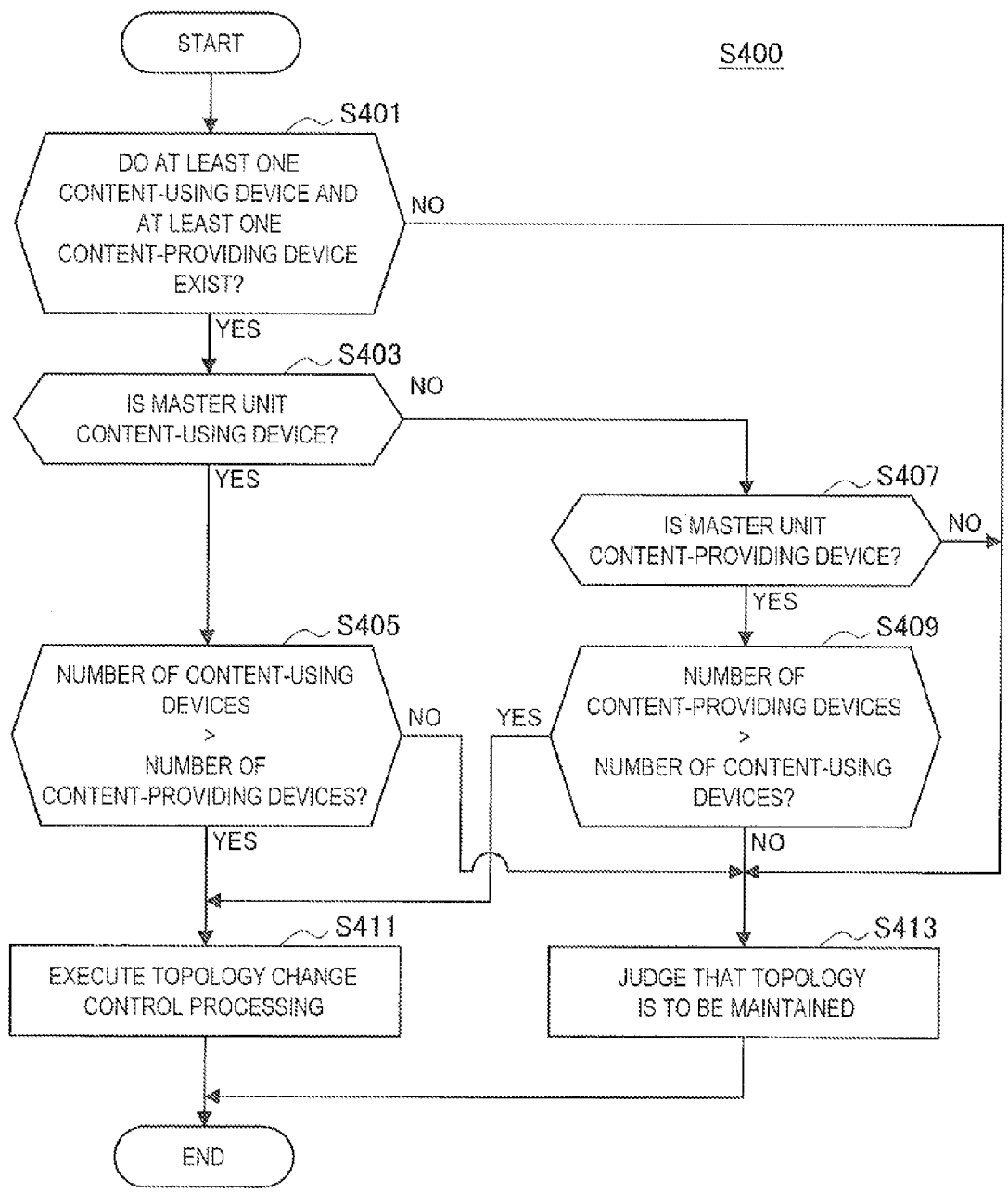
FIG. 8 is a flowchart illustrating an example of a schematic flow of topology change judgment processing according to the one embodiment.

FIG. 8 is a flowchart illustrating an example of a schematic flow of the topology change judgment processing according to the present embodiment.

In Step S401, the change judgment section 138 judges whether at least one content-using device and at least one content-providing device exist. If these devices exist, the processing proceeds to Step S403. If not, the processing proceeds to Step S413.

In Step S403, the change judgment section 138 judges whether the wireless communication device 100 which is the master unit is the content-using device. If the wireless communication device 100 is the content-using device, the processing proceeds to Step S405. If not, the processing proceeds to Step S407.

In Step S405, the change judgment section 138 judges whether the number of content-using devices is larger than the number of content-providing devices. If the number of content-using devices is larger than the number of content-providing devices, the processing proceeds to Step S411. If not, the processing proceeds to Step S413.

In Step S407, the change judgment section 138 judges whether the wireless communication device 100 which is the master unit is the content-providing device. If the wireless communication device 100 is the content-providing device, the processing proceeds to Step S409. If not, the processing proceeds to Step S413.

In Step S409, the change judgment section 138 judges whether the number of content-providing devices is larger than the number of content-using devices. If the number of content-providing devices is larger than the number of content-using devices, the processing proceeds to Step S411. If not, the processing proceeds to Step S413.

In Step S411, the change judgment section 138 judges that the topology of the wireless communication group is to be changed. Then, the processing is terminated.

In Step S413, the change judgment section 138 judges that the topology of the wireless communication group is to be maintained. Then, the processing is terminated.

Topology Change Control Processing

Figure 9:
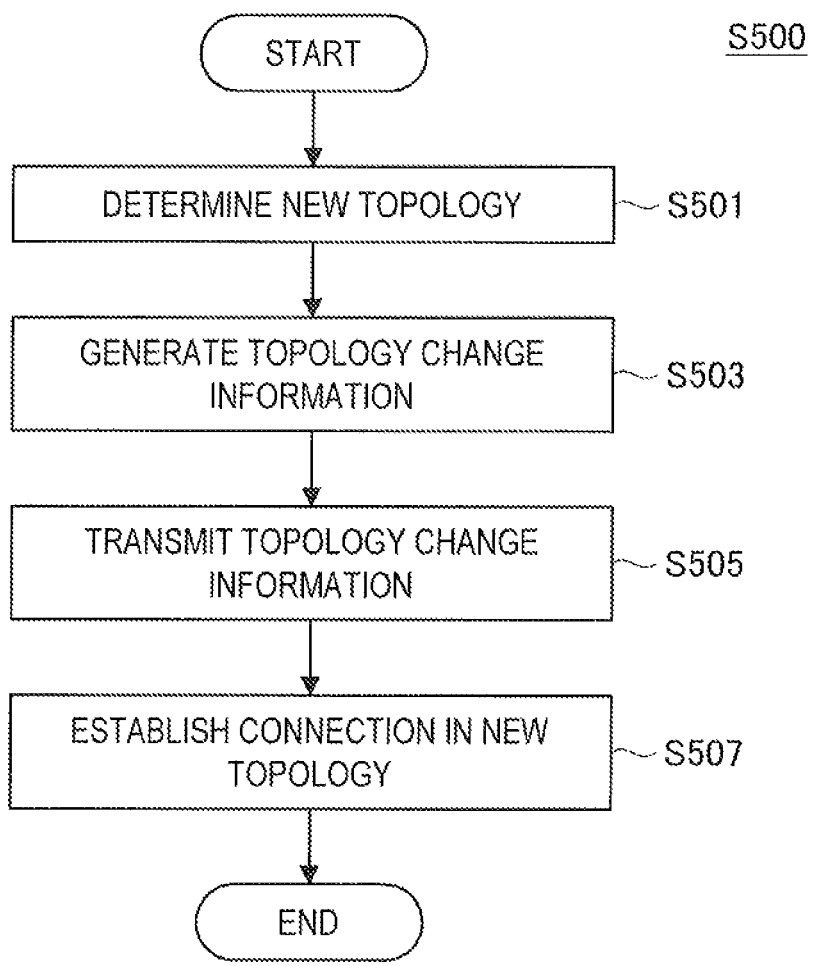
FIG. 9 is a flowchart illustrating an example of a schematic flow of topology change control processing according to the one embodiment.

FIG. 9 is a flowchart illustrating an example of a schematic flow of the topology change control processing according to the present embodiment.

In Step S501, the change control section 139 determines a new topology of the wireless communication group.

Next, in Step S503, the change control section 139 generates information necessary for the change to the new topology (that is, topology change information). Then, in Step S505, the change control section 139 causes the wireless communication section 110 to transmit the generated topology change information to the other wireless communication devices 100 in the wireless communication group.

Thereafter, in Step S507, the change control section 139 controls the wireless communication device 100 so that the wireless communication device 100 establishes connection in the new topology. For example, the change control section 139 causes the wireless communication device 100: to find one of the other wireless communication devices 100 which is identified by new-master-unit identification information in a frequency band indicated by channel information included in the topology change information (that is, the one other wireless communication device 100 which is to operate as the new master unit); and to connect to the found wireless communication device 100. More specifically, for example, the change control section 139 causes the wireless communication device 100 to perform beacon reception, key information exchange, a transaction for authentication, and the like in the frequency band. Then, the processing is terminated.

(Communication Control Processing by Slave Unit)

Next, an example of communication control processing by a slave unit will be described with reference to FIG. 10.

Content Use/Provision Information Transmission (after Joining the Group)

Figure 10:
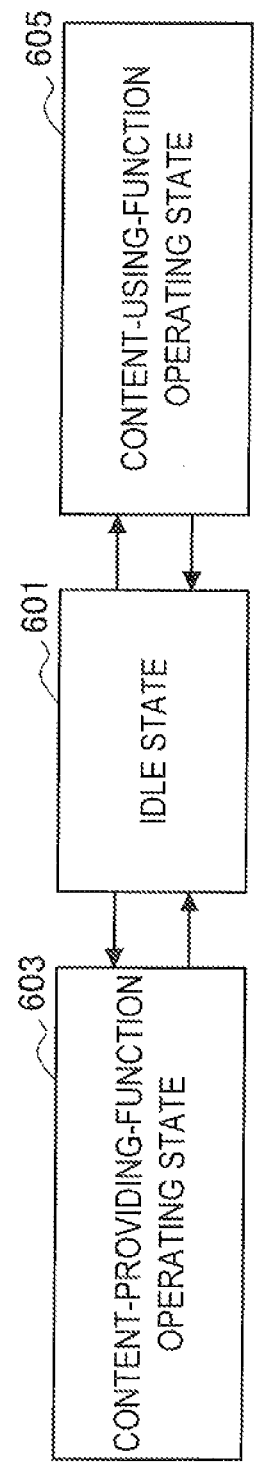
FIG. 10 is a flowchart illustrating an example of schematically shown statuses of first communication control processing according to the one embodiment performed by a slave unit.

FIG. 10 is a flowchart illustrating an example of schematically shown statuses of first communication control processing according to the present embodiment performed by the slave unit. In the first communication control processing, one of the wireless communication devices 100 which operates as the slave unit transmits content use/provision information when a state of content use or provision changes after the wireless communication device 100 joins the wireless communication group. Thus, the aforementioned first communication control processing is executed after the wireless communication device 100 joins the wireless communication group.

When execution of the function of providing content is started in the wireless communication device 100 which is in an idle state (601), the status changes from the idle state (601) to a content-providing-function operating state (603). When the status changes, the wireless communication device 100 transmits content use/provision information indicating start of content provision. When the execution of the function of providing content is terminated in the wireless communication device 100 in the content-providing-function operating state (603), the status changes from the content-providing-function operating state (603) to the idle state (601). When the status changes in this way, the wireless communication device 100 transmits content use/provision information indicating termination of the content provision.

When execution of the function of using content is started in the wireless communication device 100 in the idle state (601), the status changes from the idle state (601) to a content-using-function operating state (605). When the status changes in this way, the wireless communication device 100 transmits content use/provision information indicating start of content use. When the execution of the function of using content is terminated in the wireless communication device 100 in the content-using-function operating state (605), the status changes from the content-using-function operating state (605) to the idle state (601). When the status changes in this way, the wireless communication device 100 transmits content use/provision information indicating termination of the content use.

Content Use/Provision Information Transmission (at the Time of Joining the Group)

Figure 11:
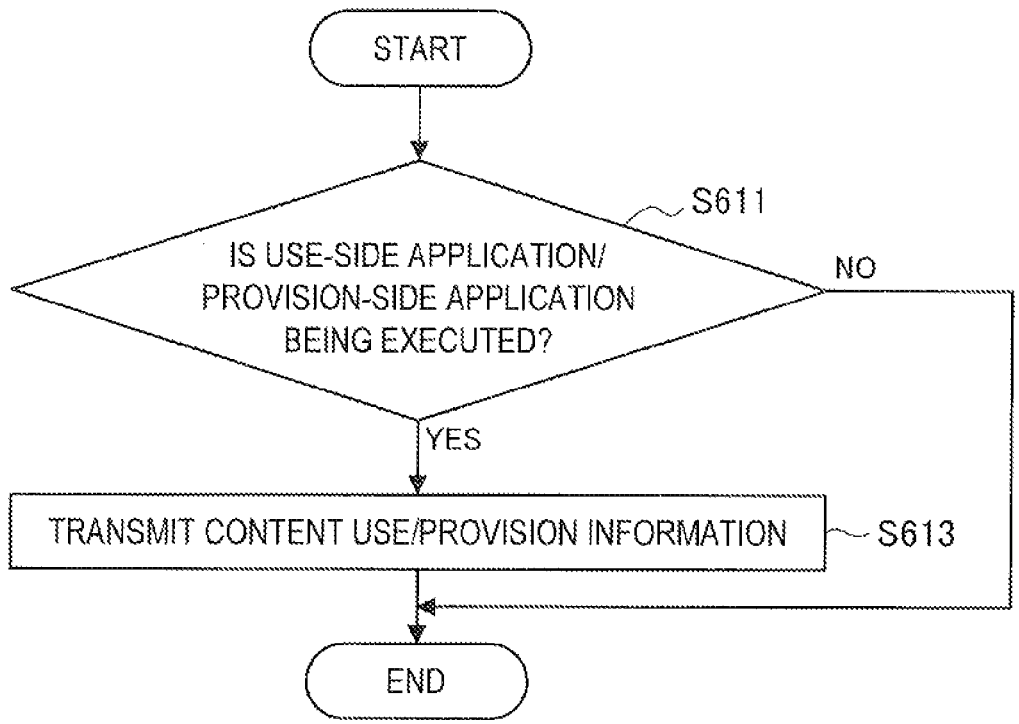
FIG. 11 is a flowchart illustrating an example of a schematic flow of second communication control processing according to the one embodiment performed by the slave unit.

FIG. 11 is a flowchart illustrating an example of a schematic flow of second communication control processing according to the present embodiment performed by the slave unit. In the second communication control processing, the wireless communication device 100 operating as the slave unit transmits content use/provision information when the wireless communication device 100 joins the wireless communication group. Thus, the aforementioned second communication control processing is executed when the wireless communication device 100 joins the wireless communication group.

In Step S611, the information supply section 135 judges whether the application section 131 is executing the use-side application or the provision-side application. If the use-side application or the provision-side application is executed, the processing proceeds to Step S613. If not, the processing is terminated.

In Step S613, the information supply section 135 causes the wireless communication section 110 to transmit content use/provision information to thereby supply the content use/provision information.

Topology Change

Figure 12:
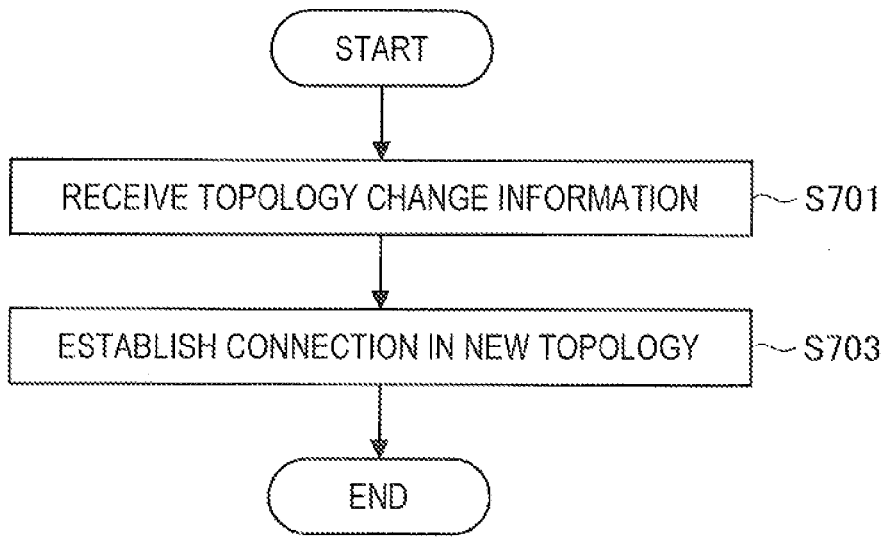
FIG. 12 is a flowchart illustrating an example of a schematic flow of third communication control processing according to the one embodiment performed by the slave unit.

FIG. 12 is a flowchart illustrating an example of a schematic flow of third communication control processing according to the present embodiment performed by the slave unit. In the third communication control processing, the wireless communication device 100 operating as the slave unit changes the topology (that is, changes connection) after the wireless communication device 100 joins the wireless communication group. Thus, the aforementioned third communication control processing is executed after the wireless communication device 100 joins the wireless communication group.

In Step S701, the wireless communication section 110 receives information necessary for the change to a new topology (that is, topology change information).

In Step S703, the change control section 139 controls the wireless communication device 100 so that the wireless communication device 100 establishes connection in the new topology. For example, when the wireless communication device 100 operates as the slave unit also in the new topology, the change control section 139 causes the wireless communication device 100: to find one of the other wireless communication devices 100 which is identified by new-master-unit identification information in a frequency band indicated by channel information included in the topology change information (that is, the one other wireless communication device 100 which is to operate as the new master unit); and to connect to the found wireless communication device 100. For example, when the wireless communication device 100 operates as the master unit in the new topology, the change control section 139 causes the wireless communication device 100 to connect to the one other wireless communication device 100 operating as the slave unit in the frequency band indicated by the channel information included in the topology change information. Then, the processing is terminated.

<4. Specific Examples of Topology Change>

Subsequently, six specific examples of topology change according to the present embodiment will be described with reference to FIGS. 13 to 18.

FIRST EXAMPLE

Figure 13:
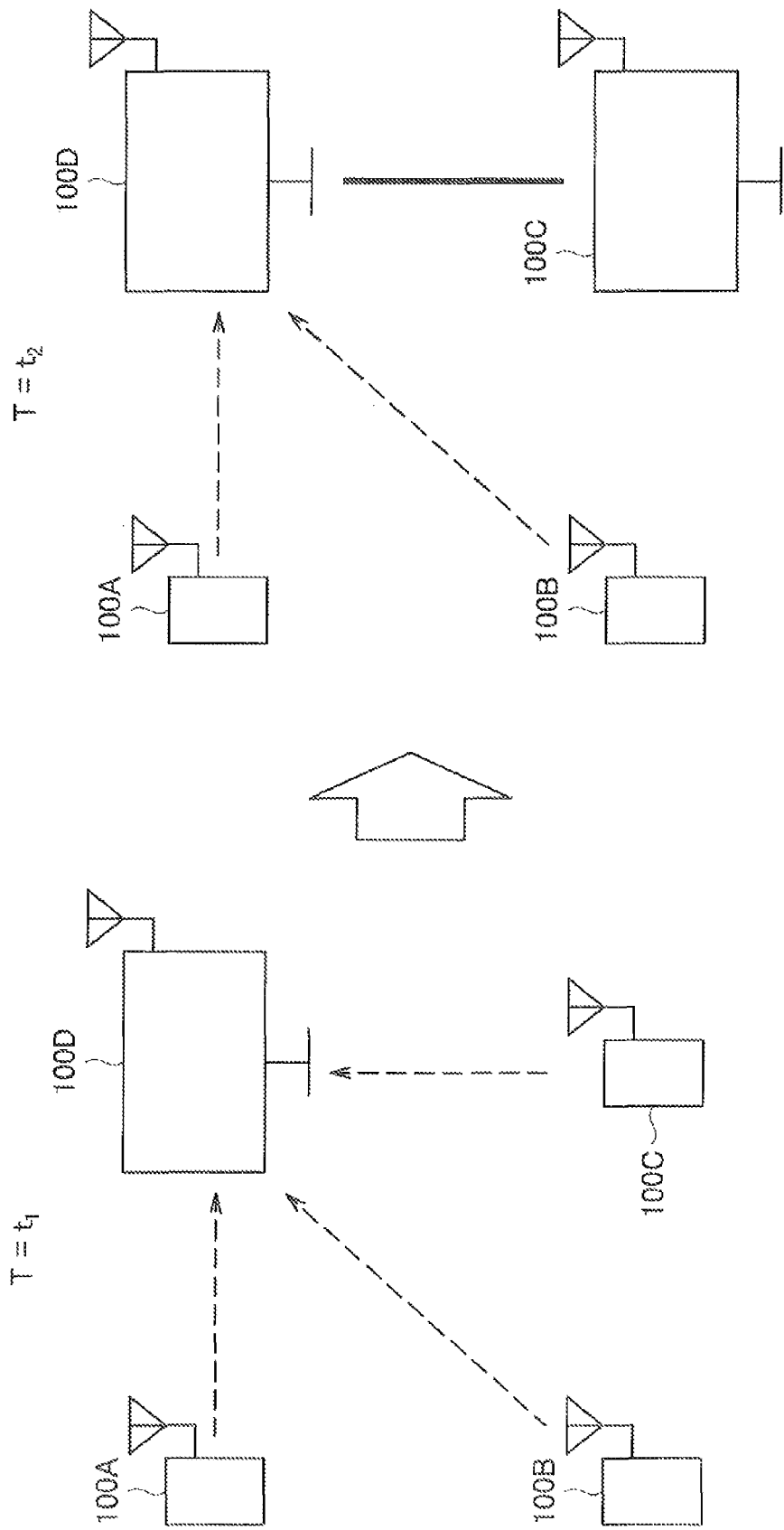
FIG. 13 is an explanatory diagram illustrating a first example of topology change according to the one embodiment.

FIG. 13 is an explanatory diagram illustrating a first example of the topology change according to the present embodiment.

Firstly, at time $t_1$, the wireless communication devices 100A, 100B, and 100C operate as slave units in the wireless communication group, and the wireless communication device 100D operates as a master unit therein. The wireless communication devices 100A, 100B, and 100C are the content-providing devices, and the wireless communication device 100D is the content-using device.

Next, at time $t_2$, the wireless communication device 100C operating as the slave unit changes from the content-providing device to the content-using device. Here, the number of content-providing devices in the wireless communication group is 2, and the number of content-using devices in the wireless communication group is 2. Accordingly, it is judged that the topology of the wireless communication group is to be maintained. Then, the topology is maintained.

SECOND EXAMPLE

Figure 14:
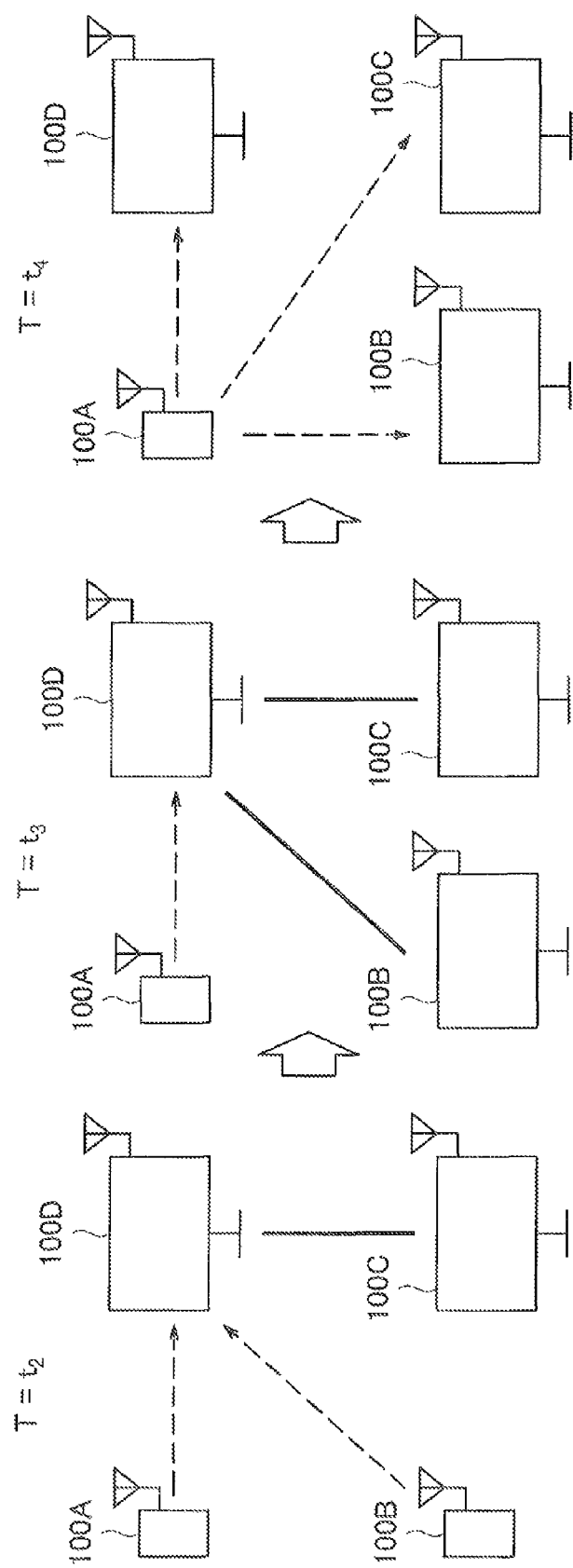
FIG. 14 is an explanatory diagram illustrating a second example of the topology change according to the one embodiment.

FIG. 14 is an explanatory diagram illustrating a second example of the topology change according to the present embodiment.

Firstly, at time $t_2$, the wireless communication devices 100A, 100B, and 100C operate as the slave units in the wireless communication group in the wireless communication devices, and the wireless communication device 100D operates as the master unit therein. The wireless communication devices 100A and 100B are the content-providing devices, and the wireless communication devices 100C and 100D are the content-using devices.

Next, at time $t_3$, the wireless communication device 100B operating as the slave unit changes from the content-providing device to the content-using device. Here, the number of content-providing devices in the wireless communication group is 1, and the number of content-using devices in the wireless communication group is 3. In other words, (the number of content-using devices)>(the number of content-providing devices) holds true. In addition, the wireless communication device 100D operating as the master unit is the content-using device falling under the majority. Accordingly, it is judged that the topology of the wireless communication group is to be changed.

Then, at time $t_4$, the topology of the wireless communication group is changed. In other words, one of the wireless communication devices 100 which is different from the wireless communication device 100D becomes a new master unit. Specifically, the wireless communication device 100A which is the minority content-providing device becomes the master unit. The wireless communication devices 100B, 100C, and 100D become the slave units and are directly connected to the wireless communication device 100A.

Such change from the topology at time $t_3$ to the topology at time $t_4$ makes data paths more efficient. Specifically, at time $t_3$, when being provided from the wireless communication device 100A which is the content-providing device to the wireless communication device 100B or 100C which is the content-using device, content is transmitted and received via the wireless communication device 100D which is the master unit. In contrast, at time $t_4$, also when being provided from the wireless communication device 100A which is the content-providing device to any of the wireless communication devices 100B, 100C, and 100D which are the content-using devices, the content is directly transmitted and received between the devices. The data paths are made shorter in this way.

THIRD EXAMPLE

Figure 15:
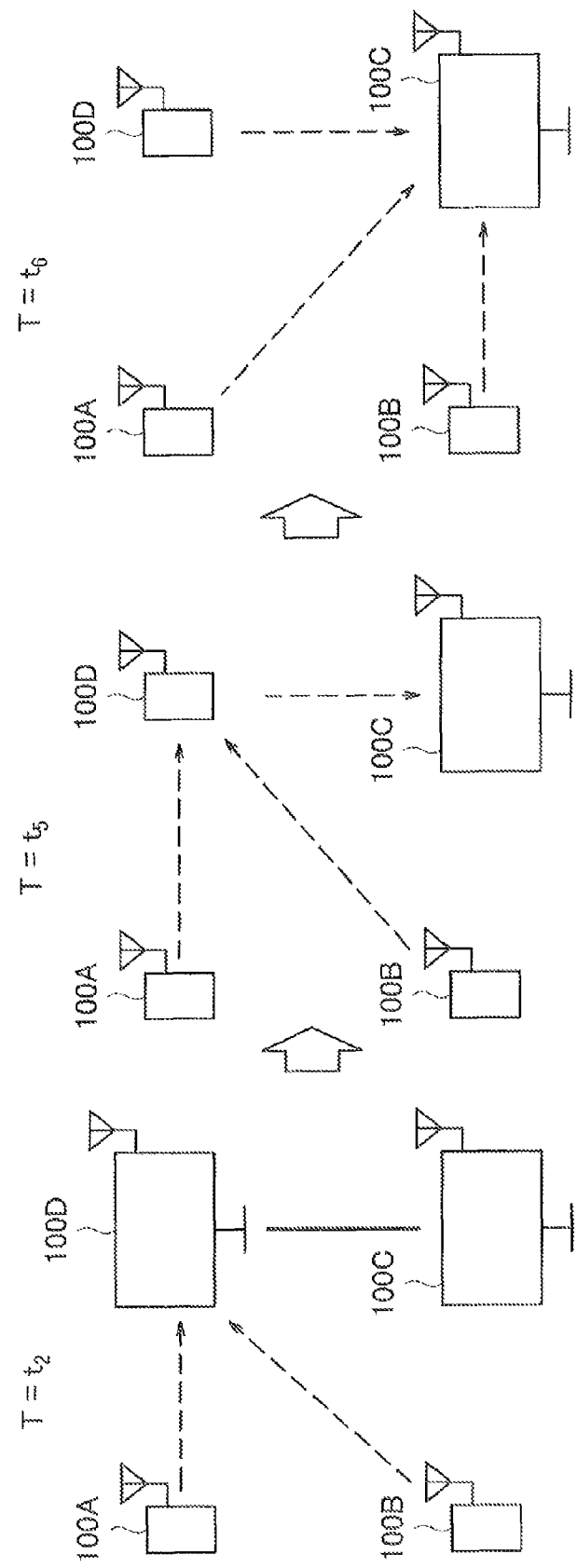
FIG. 15 is an explanatory diagram illustrating a third example of the topology change according to the one embodiment.

FIG. 15 is an explanatory diagram illustrating a third example of the topology change according to the present embodiment.

Firstly, at time $t_2$, the wireless communication devices 100A, 100B, and 100C operate as the slave units in the wireless communication group, and the wireless communication device 100D operates as the master unit therein. The wireless communication devices 100A and 100B are the content-providing devices, and the wireless communication devices 100C and 100D are the content-using devices.

Next, at time $t_5$, the wireless communication device 100D operating as the master unit changes from the content-using device to the content-providing device. Here, the number of content-providing devices in the wireless communication group is 3, and the number of content-using devices in the wireless communication group is 1. In other words, (the number of content-providing devices)>(the number of content-using devices) holds true. In addition, the wireless communication device 100D operating as the master unit is the content-providing device falling under the majority. Accordingly, it is judged that the topology of the wireless communication group is to be changed.

Then, at time $t_6$, the topology of the wireless communication group is changed. In other words, one of the wireless communication devices 100 which is different from the wireless communication device 100D becomes a new master unit. Specifically, the wireless communication device 100C which is the minority content-using device becomes the master unit. The wireless communication devices 100A, 100B, and 100D become the slave units and are directly connected to the wireless communication device 100C.

Such change from the topology at time $t_5$ to the topology at time $t_6$ makes the data paths more efficient. Specifically, at time $t_5$, when being provided from the wireless communication device 100A or 100B which is the content-providing device to the wireless communication device 100C which is the content-using device, the content is transmitted and received via the wireless communication device 100D which is the master unit. In contrast, at time $t_6$, also when being from any of the wireless communication devices 100A, 100B, and 100D which are the content-providing devices to the wireless communication device 100C which is the content-using device, the content is directly transmitted and received between the devices. The data paths are made shorter in this way.

FOURTH EXAMPLE

Figure 16:
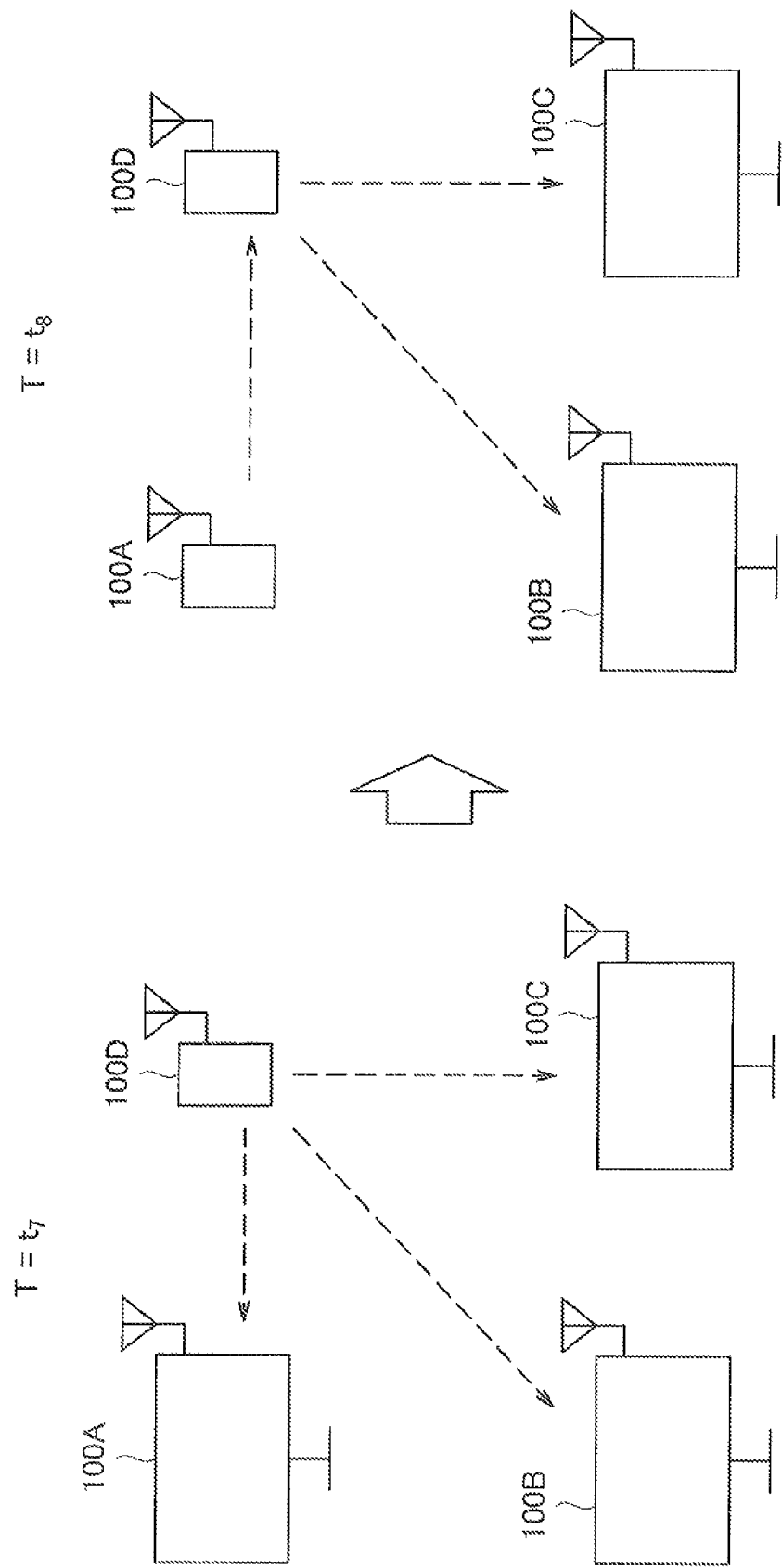
FIG. 16 is an explanatory diagram illustrating a fourth example of the topology change according to the one embodiment.

FIG. 16 is an explanatory diagram illustrating a fourth example of the topology change according to the present embodiment.

Firstly, at time $t_7$, the wireless communication devices 100A, 100B, and 100C operate as the slave units in the wireless communication group, and the wireless communication device 100D operates as the master unit therein. The wireless communication devices 100A, 100B, and 100C are the content-using devices, and the wireless communication device 100D is the content-providing device.

Next, at time $t_8$, the wireless communication device 100A operating as the slave unit changes from the content-using device to the content-providing device. Here, the number of content-providing devices in the wireless communication group is 2, and the number of content-using devices in the wireless communication group is 2. Accordingly, it is judged that the topology of the wireless communication group is to be maintained. Then, the topology is maintained.

FIFTH EXAMPLE

Figure 17:
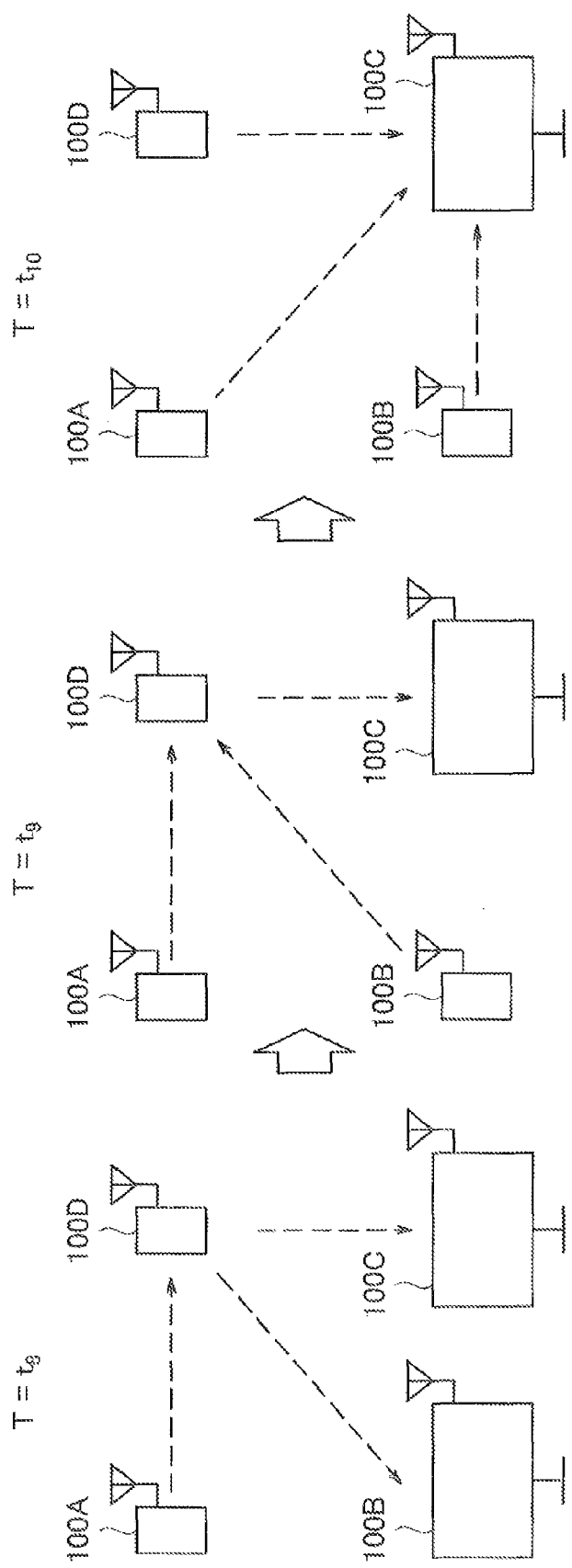
FIG. 17 is an explanatory diagram illustrating a fifth example of the topology change according to the one embodiment.

FIG. 17 is an explanatory diagram illustrating a fifth example of the topology change according to the present embodiment.

Firstly, at time $t_8$, the wireless communication devices 100A, 100B, and 100C operate as the slave units in the wireless communication group, and the wireless communication device 100D operates as the master unit therein. The wireless communication devices 100A and 100D are the content-providing devices, and the wireless communication devices 100B and 100C are the content-using devices.

Next, at time $t_9$, the wireless communication device 100B operating as the slave unit changes from the content-using device to the content-providing device. Here, the number of content-providing devices in the wireless communication group is 3, and the number of content-using devices in the wireless communication group is 1. In other words, (the number of content-providing devices)>(the number of content-using devices) holds true. In addition, the wireless communication device 100D operating as the master unit is the content-providing device falling under the majority. Accordingly, it is judged that the topology of the wireless communication group is to be changed.

Then, at time $t_{ic}$, the topology of the wireless communication group is changed. In other words, one of the wireless communication devices 100 which is different from the wireless communication device 100D becomes a new master unit. Specifically, the wireless communication device 100C which is the minority content-using device becomes the master unit. The wireless communication devices 100A, 100B, and 100D become the slave units, and are directly connected to the wireless communication device 100C.

Such change from the topology at time $t_9$ to the topology at time $t_{ic}$ makes the data paths more efficient. Specifically, at time $t_9$, when being provided from the wireless communication device 100A or 100B which is the content-providing device to the wireless communication device 100C which is the content-using device, the content is transmitted and received via the wireless communication device 100D which is the master unit. In contrast, at time $t_{10}$, also when being provided from any of the wireless communication devices 100A, 100B, and 100D which are the content-providing devices to the wireless communication device 100C which is the content-using device, the content is directly transmitted and received between the devices. The data paths are made shorter in this way.

SIXTH EXAMPLE

Figure 18:
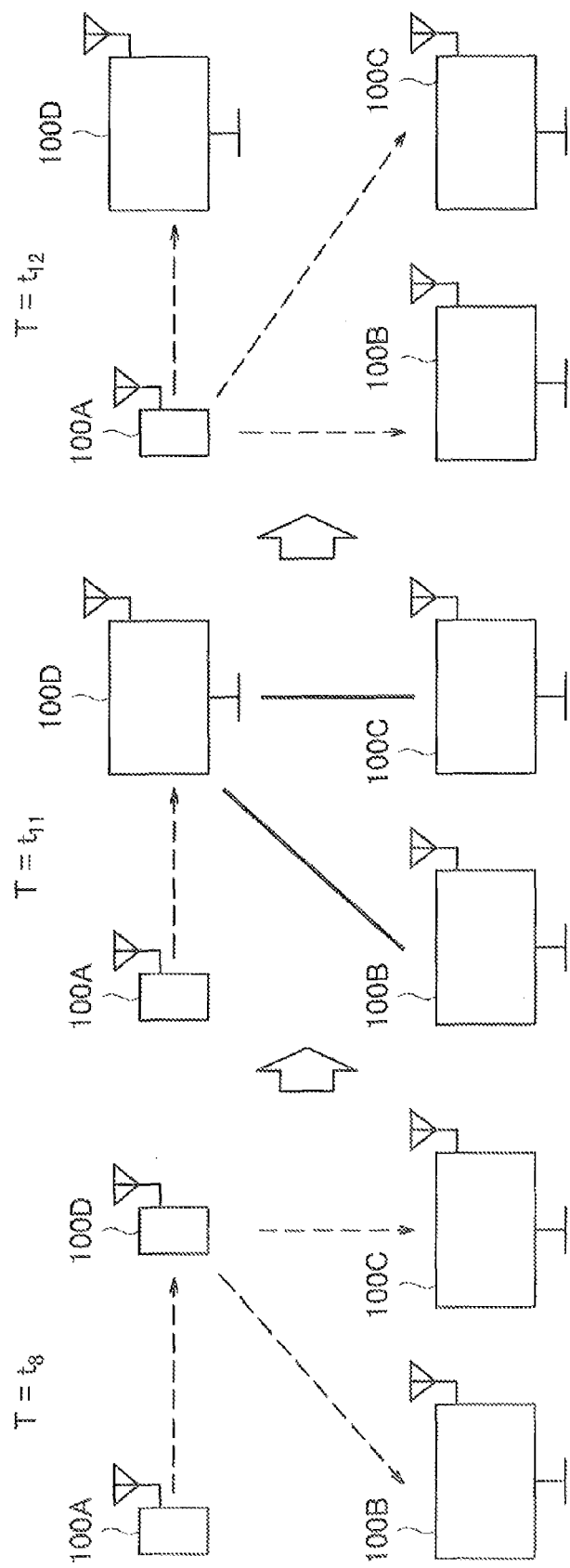
FIG. 18 is an explanatory diagram illustrating a sixth example of the topology change according to the one embodiment.

FIG. 18 is an explanatory diagram illustrating a sixth example of the topology change according to the present embodiment.

Firstly, at time $t_8$, the wireless communication devices 100A, 100B, and 100C operate as the slave units in the wireless communication group, and the wireless communication device 100D operates as the master unit therein. The wireless communication devices 100A and 100D are the content-providing devices, and the wireless communication devices 100B and 100C are the content-using devices.

Next, at time $t_{11}$, the wireless communication device 100D operating as the master unit changes from the content-providing device to the content-using device. Here, the number of content-using devices in the wireless communication group is 3, and the number of content-providing devices in the wireless communication group is 1. In other words, (the number of content-using devices)>(the number of content-providing devices) holds true. In addition, the wireless communication device 100D operating as the master unit is the content-using device falling under the majority. Accordingly, it is judged that the topology of the wireless communication group is to be changed.

Then, at time $t_{12}$, the topology of the wireless communication group is changed. In other words, one of the wireless communication devices 100 which is different from the wireless communication device 100D becomes a new master unit. Specifically, the wireless communication device 100A which is the minority content-providing device becomes the master unit. The wireless communication devices 100B, 100C, and 100D become the slave units, and are directly connected to the wireless communication device 100A.

Such change from the topology at time $t_{11}$ to the topology at time $t_{12}$ makes the data paths more efficient. Specifically, at time $t_{11}$, when being provided from the wireless communication device 100A which is the content-providing device to the wireless communication device 100B or 100C which is the content-using device, the content is transmitted and received via the wireless communication device 100D which is the master unit. In contrast, at time $t_{12}$, also when being provided from the wireless communication device 100A which is the content-providing device to any of the wireless communication devices 100B, 100C, and 100D, the content is directly transmitted and received between the devices. The data paths are made shorter in this way.

<5. Summarization>

The communication devices and the processing according to the embodiment of the present disclosure have heretofore been described with reference to FIGS. 1 to 18. According to the embodiment of the present disclosure, in the group for wireless communication (that is, the wireless communication group), one of the wireless communication devices 100 receives information indicating a state of content use or provision by at least one other device in the wireless communication group (that is, the content use/provision information).

Then, based on the received content use/provision information, the one of the wireless communication devices 100 calculates the number of devices currently operating the function of providing content (that is, the content-providing devices) in the aforementioned wireless communication group and the number of devices currently operating the function of using content (that is, the content-using devices) in the aforementioned wireless communication group. Thereafter, based on a relationship between the number of content-providing devices and the number of content-using devices and on a state of content provision or use by the wireless communication device 100 operating as the master unit in the aforementioned wireless communication group, the wireless communication device 100 judges whether to change the topology of the aforementioned wireless communication group.

Thereby, when the wireless communication group has inefficient data paths, the topology thereof is changed to a different topology. Consequently, the wireless communication devices 100 in the wireless communication group can perform communication through efficient data paths.

For example, the aforementioned wireless communication group is a directly connected group using wireless communication which includes one master unit directly connected to one or more slave units. Moreover, for example, the changing of the topology of the aforementioned wireless communication group is causing a different device to operate as the master unit. In other words, the wireless communication device 100 operating as the master unit judges whether to cause the different device to operate as the master unit.

Thereby, when content is likely to be transmitted and received more frequently than necessary via the wireless communication device 100 which is the master unit in the directly connected wireless communication group, the master unit is changed. Consequently, the content can be transmitted and received more frequently without passing through the master unit. In other words, data paths can be more efficient.

For example, when it is judged that a different device is to be caused to operate as the master unit, one of the wireless communication devices 100 in the aforementioned wireless communication group operates as the new master unit.

This makes it possible to change the topology to a new one without newly searching for the wireless communication device 100 which is to operate as the master unit, and thus it is possible to quickly start the wireless communication in the new topology.

For example, when the number of content-providing devices is larger than the number of content-using devices, the aforementioned one of the wireless communication devices 100 is the content-using device among the devices in the aforementioned wireless communication group. When the number of content-using devices is larger than the number of content-providing devices, the aforementioned one of the wireless communication devices 100 is the device currently operating the function of providing content among the devices in the aforementioned wireless communication group.

Thereby, the wireless communication device 100 falling under the minority in the content-providing devices and the content-using devices in the wireless communication group operates as the new master unit. Thus, content can be directly transmitted and received between the wireless communication device 100 falling under the majority in the content-providing device and the content-using device and the minority wireless communication device 100 to operate as the new master unit, without passing through any other device. Thus, when content is transmitted and received frequently between the aforementioned majority wireless communication device 100 and the minority wireless communication device 100 which is to operate as the new master unit, data paths are efficient in the new topology.

For example, the aforementioned one of the wireless communication devices 100 operates as the master unit in the aforementioned wireless communication group or in a new wireless communication group including part or all of the devices in the aforementioned wireless communication group.

This enables the wireless communication devices 100 which are members of the wireless communication group to continue to use and provide the content.

For example, when it is judged that a different device is caused to operate as the master unit, the information necessary for the change to the new topology (that is, the topology change information) is shared in advance in the aforementioned wireless communication group. More specifically, for example, the topology change information includes at least one of: the identification information for identifying one of the wireless communication devices 100 to newly operate as the master unit ("new-master-unit identification information"); information on security to be set ("security information"); and information on a channel to be used for the wireless communication ("channel information").

This makes it possible to quickly establish connection in the new topology. For example, with the aforementioned information on the channel, it is possible to establish the connection without scanning for searching for the channel through which the master unit transmits a beacon for establishing connection in the new topology, and thus time taken for the connection is made shorter.

For example, the aforementioned content is the content satisfying the predetermined condition. More specifically, for example, the predetermined condition includes the condition that a data amount of the content exceeds a predetermined value.

Thereby, target content for the topology change judgment is limited. Thus, it is possible to avoid delay of content transmission and reception caused by blindly changing of the topology. For example, if target content is limited to content having a large data amount, it is possible to avoid blindly changing the topology performed in the case of providing and using content requiring only a short time in transmission and reception.

In addition, the predetermined condition may include a condition that content is demanded to have real-time properties.

Thereby, it is possible to avoid blindly changing the topology performed in the case of providing and using content allowing time-consuming transmission and reception.

In addition, the predetermined condition may be a condition that the type of content falls under a predetermined type. More specifically, the predetermined type may include audio or video.

Thereby, target content is limited to content such as audio or video content which generally has a large data amount or which is demanded to have real-time properties, and thus it is possible to avoid blindly changing the topology performed in the case of providing and using content requiring only a short time in transmission and reception or content allowing time-consuming transmission and reception.

In addition, the topology of the wireless communication group does not have to be changed while content is being transmitted and received. For example, the topology may be changed after the content is transmitted and received.

This makes it possible to avoid interruption of content transmission and reception even in progress.

In addition, when operating as the master unit in the aforementioned wireless communication group, the wireless communication device 100 judges whether to change the topology of the aforementioned wireless communication group.

The master unit makes a judgment in this way, and thereby it is possible to more easily collect the content use/provision information.

The preferable embodiment of the present disclosure has heretofore been described with reference to the appended drawings. It goes without saying that the present disclosure is not limited to the example. It should be understood by those skilled in the art that various modifications, combinations, sub-combinations and alterations may occur depending on design requirements and other factors insofar as they are within the scope of the appended claims or the equivalents thereof.

For example, the example has been described in which the wireless communication device operating as the master unit in the wireless communication group receives the content use/provision information, calculates the number of content-using devices and the number of content-providing devices, and judges the topology change, but the embodiment of the present disclosure is not limited to the example. For example, one of the wireless communication devices operating as the slave unit in the wireless communication group may perform these operations.

For example, the example has been described in which the wireless communication device operating as the master unit in the wireless communication group generates and transmits the topology change information, but the embodiment of the present disclosure is not limited to the example. For example, one of the wireless communication devices which is operating as the slave unit and is to operate as the new master unit may generate and transmit the topology change information.

The example has been described in which one of the wireless communication devices in the wireless communication group executes one use-side application or one provision-side application, but the embodiment of the present disclosure is not limited to the example. For example, the wireless communication device in the wireless communication group may execute a plurality of use-side applications. That is, the wireless communication device may use a plurality of contents. The wireless communication device may also execute a plurality of provision-side applications. That is, the wireless communication device may provide a plurality of contents. When the total data amount of the plurality of contents provided by the wireless communication device exceeds the aforementioned predetermined value, the wireless communication device may be counted as the content-providing device. When a data amount of any of the plurality of contents provided by the wireless communication device exceeds the aforementioned predetermined value, the wireless communication device may be counted as the content-providing device.

Moreover, the processing steps of the communication control processing in the present specification do not necessarily have to be executed in time series in the order described in the flowchart. For example, the processing steps in the communication control processing may be executed in the order different from the order described in the flowchart, or may be executed in parallel.

Further, it is possible to create a computer program for causing hardware such as a CPU, a ROM, and a RAM which are incorporated into a radio communication apparatus to exert functions equivalent to those in the configuration of the radio communication apparatus. Further, a recording medium storing the computer program is also provided.

Additionally, the present technology may also be configured as below.

(1) A wireless communication device including:

a wireless communication section which receives, in a group for wireless communication, information indicating a state of content use or provision by another device in the group;

a calculation section which calculates, based on the received information, a number of devices operating a function of providing the content in the group and a number of devices operating a function of using the content in the group; and a judgment section which judges whether to change a topology of the group based on a relationship between the number of devices operating the function of providing the content and the number of devices operating the function of using the content and on states of content provision and use by a device operating as a master unit in the group.

(2) The wireless communication device according to (1), wherein the changing of the topology of the group is causing a different device to operate as the master unit.

(3) The wireless communication device according to (2), wherein when the different device is judged to be caused to operate as the master unit, one device in the group operates as a new master unit.

(4) The wireless communication device according to (3), wherein the one device is the device operating the function of using the content among devices in the group when the number of devices operating the function of providing the content is larger than the number of devices operating the function of using the content, and is the device operating the function of providing the content among the devices in the group when the number of devices operating the function of using the content is larger than the number of devices operating the function of providing the content.

(5) The wireless communication device according to (3) or (4), wherein the one device operates as the master unit in the group or in a new group including part or all of devices in the group.

(6) The wireless communication device according to (5), wherein when the different device is judged to be caused to operate as the master unit, information necessary for wireless communication in a new topology is shared in the group in advance.

(7) The wireless communication device according to (6), wherein the information necessary for wireless communication in the new topology includes at least one of identification information for identifying a device to newly operate as the master unit, information on security to be set, and information on a channel to be used for the wireless communication.

(8) The wireless communication device according to (1), wherein the content is content satisfying a predetermined condition.

(9) The wireless communication device according to (8), wherein the predetermined condition includes a condition that a data amount of the content exceeds a predetermined value.

(10) The wireless communication device according to (8), wherein the predetermined condition includes a condition that the content is demanded to have a real-time property.

(11) The wireless communication device according to (8), wherein the predetermined condition includes a condition that a type of the content falls under a predetermined type.

(12) The wireless communication device according to (11), wherein the predetermined type includes audio or video.

(13) The wireless communication device according to any one of (1) to (12), wherein the topology of the group is not changed while the content is being transmitted and received.

(14) The wireless communication device according to any one of (1) to (13), wherein when the wireless communication device operates as the master unit in the group, the judgment section judges whether to change the topology of the group.

(15) The wireless communication device according to any one of (1) to (14), wherein the group is a directly connected group using wireless communication which includes a master unit directly connected to one or more slave units.

(16) A program causing a computer which controls a wireless communication device to function as:

an acquisition section which acquires information indicating a state of content use or provision by another device in a group for wireless communication when the wireless communication device receives the information in the group;

a calculation section which calculates, based on the received information, a number of devices operating a function of providing the content in the group and a number of devices operating a function of using the content in the group; and a judgment section which judges whether to change a topology of the group based on a relationship between the number of devices operating the function of providing the content and the number of devices operating the function of using the content and on states of content provision and use by a device operating as a master unit in the group.

(17) A communication control method including:

receiving, in a group for wireless communication, information indicating a state of content use or provision by another device in the group;

calculating, based on the received information, a number of devices operating a function of providing the content in the group and a number of devices operating a function of using the content in the group; and judging whether to change a topology of the group based on a relationship between the number of devices operating the function of providing the content and the number of devices operating the function of using the content and on states of content provision and use by a device operating as a master unit in the group.

The present disclosure contains subject matter related to that disclosed in Japanese Priority Patent Application JP 2012-224013 filed in the Japan Patent Office on Oct. 9, 2012, the entire content of which is hereby incorporated by reference.

What is claimed is:

1. A wireless communication device comprising:
a wireless communication transceiver configured to receive, in a group of devices for wireless communication, information indicating a state of content use or provision by another device in the group; and
one or more processors configured to:
calculate, based on the received information, a number of devices operating a function of providing the content in the group and a number of devices operating a function of using the content in the group; and
judge whether to change a topology of the group based on a relationship between the number of devices operating the function of providing the content and the number of devices operating the function of using the content and on states of content provision and use by a device operating as a master unit in the group.

2. The wireless communication device according to claim 1, wherein the changing of the topology of the group is causing a different device to operate as the master unit.

3. The wireless communication device according to claim 2, wherein when the different device is judged to be caused to operate as the master unit, one device in the group operates as a new master unit.

4. The wireless communication device according to claim 3, wherein the one device is the device operating the function of using the content among devices in the group when the number of devices operating the function of providing the content is larger than the number of devices operating the function of using the content, and is the device operating the function of providing the content among the devices in the group when the number of devices operating the function of using the content is larger than the number of devices operating the function of providing the content.

5. The wireless communication device according to claim 3, wherein the one device operates as the master unit in the group or in a new group including part or all of devices in the group.

6. The wireless communication device according to claim 3, wherein when the different device is judged to be caused to operate as the master unit, information necessary for wireless communication in a new topology is shared in the group in advance.

7. The wireless communication device according to claim 6, wherein the information necessary for wireless communication in the new topology includes at least one of identification information for identifying a device to newly operate as the master unit, information on security to be set, and information on a channel to be used for the wireless communication.

8. The wireless communication device according to claim 1, wherein the content is content satisfying a predetermined condition.

9. The wireless communication device according to claim 8, wherein the predetermined condition includes a condition that a data amount of the content exceeds a predetermined value.

10. The wireless communication device according to claim 8, wherein the predetermined condition includes a condition that the content is demanded to have a real-time property.

11. The wireless communication device according to claim 8, wherein the predetermined condition includes a condition that a type of the content falls under a predetermined type.

12. The wireless communication device according to claim 11, wherein the predetermined type includes audio or video.

13. The wireless communication device according to claim 1, wherein the topology of the group is not changed while the content is being transmitted and received.

14. The wireless communication device according to claim 1, wherein when the wireless communication device operates as the master unit in the group, the one or more processors judge whether to change the topology of the group.

15. The wireless communication device according to claim 1, wherein the group is a directly connected group using wireless communication which includes a master unit directly connected to one or more slave units.

16. A non-transitory computer readable medium having stored thereon, a set of computer-executable instructions causing a computer which controls a wireless communication device to perform steps comprising:
acquiring information indicating a state of content use or provision by another device in a group of devices for wireless communication when the wireless communication device receives the information in the group;
calculating, based on the received information, a number of devices operating a function of providing the content in the group and a number of devices operating a function of using the content in the group; and
judging whether to change a topology of the group based on a relationship between the number of devices operating the function of providing the content and the number of devices operating the function of using the content and on states of content provision and use by a device operating as a master unit in the group.

17. A communication control method comprising:
receiving, in a group for wireless communication, information indicating a state of content use or provision by another device in the group;
calculating, based on the received information, a number of devices operating a function of providing the content in the group and a number of devices operating a function of using the content in the group; and
judging whether to change a topology of the group based on a relationship between the number of devices operating the function of providing the content and the number of devices operating the function of using the content and on states of content provision and use by a device operating as a master unit in the group.

* * * * *